US011493836B2

(12) United States Patent
Peckham et al.

(10) Patent No.: US 11,493,836 B2
(45) Date of Patent: Nov. 8, 2022

(54) LIGHT FIELD PROJECTOR DEVICE

(71) Applicant: Avalon Holographies Inc., St. John's (CA)

(72) Inventors: Jordan Peckham, Portugal Cove-St. Philips (CA); Daniel Webber, St. John's (CA)

(73) Assignee: Avalon Holographies Inc., St. John's (CA)

( * ) Notice: Subject to any disclaimer, the term of this patent is extended or adjusted under 35 U.S.C. 154(b) by 8 days.

(21) Appl. No.: 16/993,512

(22) Filed: Aug. 14, 2020

(65) Prior Publication Data

US 2021/0048735 A1    Feb. 18, 2021

Related U.S. Application Data

(60) Provisional application No. 62/886,521, filed on Aug. 14, 2019.

(51) Int. Cl.
| | | |
|---|---|---|
| *G03B 21/14* | (2006.01) | |
| *G02B 30/27* | (2020.01) | |
| *G03B 21/20* | (2006.01) | |
| *G02B 27/00* | (2006.01) | |
| *G02B 27/30* | (2006.01) | |

(52) U.S. Cl.
CPC ....... *G03B 21/142* (2013.01); *G02B 27/0075* (2013.01); *G02B 27/30* (2013.01); *G02B 30/27* (2020.01); *G03B 21/2033* (2013.01)

(58) Field of Classification Search
CPC ... H04N 13/00–398; H04N 9/31–3197; G03B 21/00–64; G09G 2300/026; G09F 9/30–307; G06F 3/1446; G02B 30/36; G02B 30/40; G02B 30/50; G02B 30/52; G02B 30/00–60
See application file for complete search history.

(56) References Cited

U.S. PATENT DOCUMENTS

| | | | |
|---|---|---|---|
| 6,344,928 B1 * | 2/2002 | Honguh | G02B 3/0056 359/621 |
| 6,945,652 B2 | 9/2005 | Sakata | |
| 9,383,591 B2 | 7/2016 | Pasolini | |

(Continued)

OTHER PUBLICATIONS

Darmon, LED-Illuminated Pico Projector Architectures, Society for Information Display, Issue SSN0097, Displaytech, Inc., Longmont, Colorado, USA.

(Continued)

*Primary Examiner* — Christopher A Lamb, II

(57) ABSTRACT

A light field projector device is described which outputs a light field. The projector has a projector base with a projection optical system configured to output light rays to form a projected image, a collimating optical system configured for collimation of the projected image light rays to form a second projected image, which is directed to a display optical system to produce a light field image. Light field projector devices may be used individually or in combination with one or more other projectors which can be arranged to form a direct projection light field display. The arrangement of light field projector devices may have an individual or shared display optical system. The projector device is designed to provide high pixel density, providing an image that looks crisp and unpixellated.

15 Claims, 33 Drawing Sheets

(56) References Cited

U.S. PATENT DOCUMENTS

| | | |
|---|---|---|
| 9,456,116 B2 | 9/2016 | Lapstun |
| 9,880,325 B2 | 1/2018 | Lanman |
| 10,255,889 B2 | 4/2019 | Lin |
| 2008/0180643 A1* | 7/2008 | Endo ................ G03B 21/10 353/38 |
| 2011/0285968 A1* | 11/2011 | Huang ............ H04N 13/317 353/31 |
| 2014/0063473 A1 | 3/2014 | Pasolini |
| 2014/0300869 A1 | 10/2014 | Hirsch |
| 2014/0347361 A1 | 11/2014 | Alpaslan |
| 2016/0295178 A1 | 10/2016 | Damberg |
| 2017/0316762 A1 | 11/2017 | El-Ghoroury |
| 2018/0101018 A1 | 4/2018 | Chung |
| 2018/0143449 A1 | 5/2018 | Popovich |
| 2018/0149958 A1* | 5/2018 | Kong ................ G03B 29/00 |
| 2018/0292663 A1* | 10/2018 | Richards ........... G03B 21/005 |
| 2019/0034035 A1* | 1/2019 | Han ................... G02B 1/002 |
| 2019/0227319 A1* | 7/2019 | Trail ............... G02B 6/12007 |
| 2019/0387206 A1* | 12/2019 | Ishii ................ H04N 9/3164 |

OTHER PUBLICATIONS

Lee, Compact multi-projection 3D display system with light-guide projection, The Optical Society, Nov. 2, 2015, vol. 23, No. 22, DOI:10.1364/OE.23.028945, Optics Express 28946.

* cited by examiner

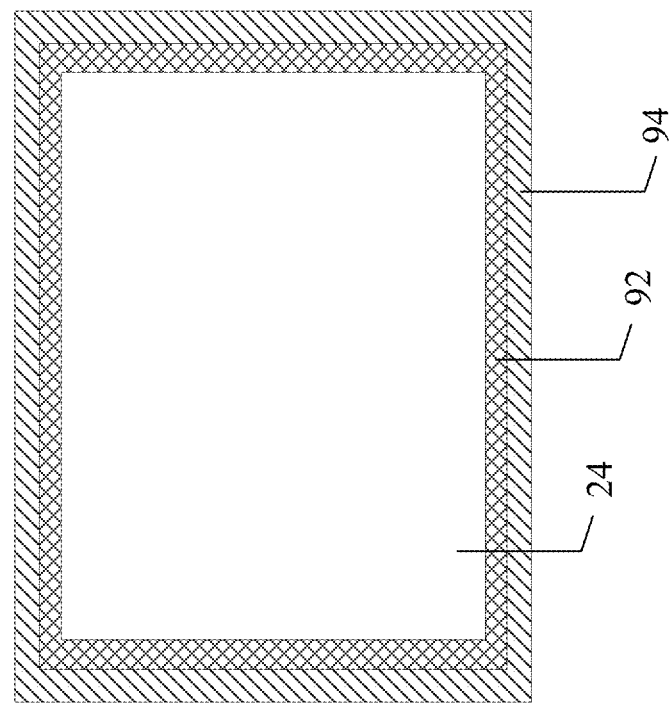
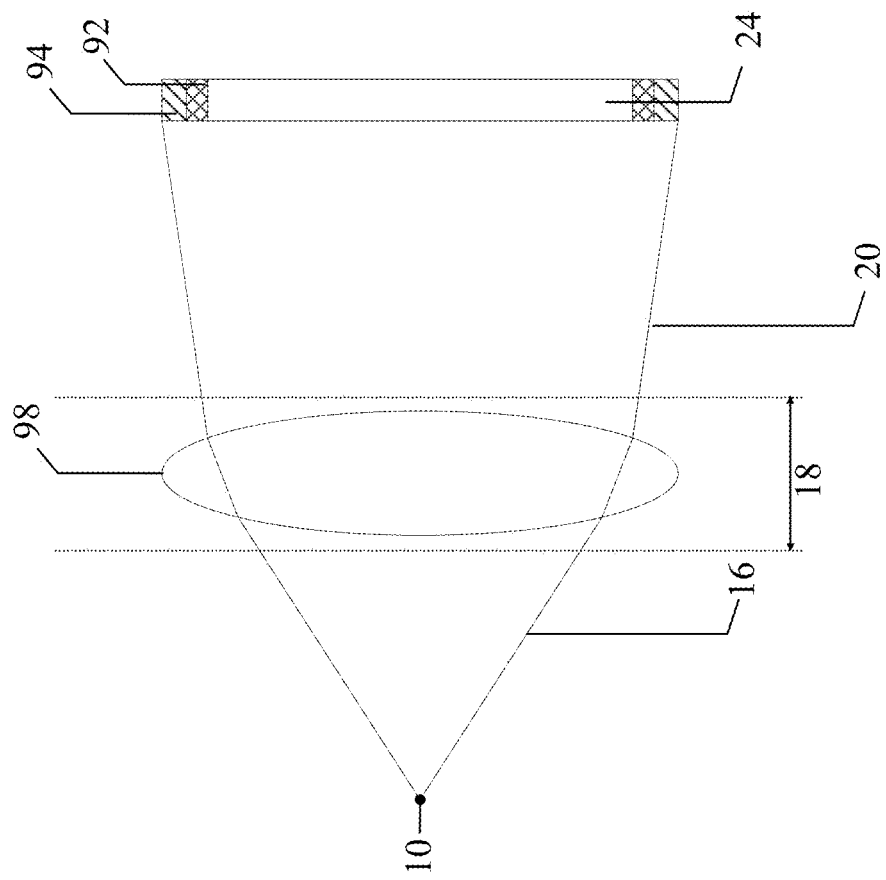

LIGHT FIELD PROJECTOR DEVICE

CROSS-REFERENCE TO RELATED APPLICATIONS

This application claims priority to U.S. Patent Application Ser. No. 62/886,521, filed on Aug. 14, 2019, the contents of which are incorporated herein by reference in their entirety.

FIELD OF THE INVENTION

The present disclosure relates to light field display technology and more specifically, light field projector devices. The present disclosure particularly relates to a light field projector device which individually, or within an array of said devices, forms a high angular resolution, wide field of view, multiple view display.

BACKGROUND OF THE INVENTION

Light field displays provide multiple views, allowing a user to receive a separate view in each eye. While current displays in this category provide an interesting viewing experience, a captivating light field display requires a high pixel density, low angular separation between views, and a large viewing angle. It is desired that a user experiences smooth transitions between viewing zones, while maintaining an independent and perceivable view from the adjacent views. Three dimensional displays allow the viewer to gain a broader perspective on the image they are viewing. Some three-dimensional displays use polarized light and require the viewer to wear specialized glasses. Others use direct projection and produce an image that provides some parallax in a single dimension.

Projector-based light field displays generally consist of one or more projectors and generally require a series of optical systems to generate a light field. To achieve the number of pixels to achieve a high-definition light field display, an increased number of projectors may be required in combination with multiple optical systems resulting in a large and often costly system.

United States patent application publication number US20180101018 to Chung et al. describes a light field display including a screen, a grating pixel array, and an image generator. This system requires the grating pixel array to display the output light field image, thus resulting in a large display with significant power requirements.

U.S. Pat. No. 9,383,591 to Pasolini describes a pico-projector device having a light source to create a light beam, a mirror mechanism to direct the light beam towards a displaying surface, and a driving circuit to supply driving signals for the mirror mechanism to generate and subtract compensation signals for stabilizing the projected image. The pico-projector device described uses a gyroscope to compensate for any motion of the device. This device could create a projected image however would require additional optical components and processing to create a light field.

There remains a need for a light field projector device which can provide a full parallax light field display.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

It is an object of the present invention to provide a light field projector device having light emitting diodes, a projector body, and a plurality of optical systems configured to cause a plurality of light rays generated by the light emitting diodes to create a light field. It is another object of the present invention to provide an array of light field projector devices configured to provide a high angular resolution, wide field of view, multiple view light field display.

In an aspect there is provided a light field projector device comprising: a light source comprising a light emitting diode (LED); a projection optical system comprising: an illumination optical system comprising at least one lens to receive light from the light source and direct the light into a single ray path; a pixel forming device to receive light from the illumination optical system and convert the light into a pixel array; and a magnifying optical system; and a collimating optical system comprising a collimating optical component to collimate light from the pixel array received from the magnifying optical system and create a collimated projected image.

In an embodiment, the device further comprises a display optical system positioned to receive the collimated projected image from the collimating optical system and display the image.

In another embodiment, the display optical system comprises at least one lens, lenslet, metasurface, or combination thereof.

In an embodiment, the display optical system is shared with at least one other light field projector device.

In an embodiment, the collimating optical system comprises one or more diffusing surface, collimating lenslet, frameless collimating lenslet plano-convex lens, convex lens, and bi-convex lens.

In an embodiment, the light source comprises more than one light emitting diode.

In an embodiment, the device comprises a plurality of light sources, wherein the illumination optical system receives and directs light from each of the plurality of light sources to form a single ray path.

In an embodiment, the light source comprises at least one red LED, at least one green LED, and at least one blue LED.

In an embodiment, the device further comprises more than one light source, at least one of the light sources comprising more than one LED of at least two different colors.

In an embodiment, the device further comprises a projector housing.

In an embodiment, the device further comprises an adjustment mechanism for adjustment of the ray path exiting the projector device.

In an embodiment, the device further comprises a diffuser downstream the collimating optical system along the ray path.

In another aspect there is provided an light field image display device comprising: a plurality of light field projector devices arranged in an array, each projector device comprising: a light source comprising a light emitting diode (LED); a projection optical system comprising: an illumination optical system comprising at least one lens to receive light from the light source and direct the light into a single ray path; a pixel forming device to receive light from the illumination optical system and convert the light into a pixel array; and a magnifying optical system; and a collimating optical system comprising a collimating optical component to collimate light received from the magnifying optical system and create a collimated projected image; and a display optical system positioned to receive the collimated projected image from the collimating optical system of at least one of the plurality of light field projector devices and display the image.

In an embodiment, the display optical system is shared by two or more of the light field projector devices in the light field image display device.

In another embodiment, the display device further comprises a housing for holding in place the plurality of light field projector devices.

In another embodiment, the display device further comprises a plurality of adjustment mechanisms for adjustment of the ray path exiting each of the plurality of projector devices.

In another aspect there is provided a method for creating a tiled light field image with a plurality of light field projector devices, the method comprising: creating a light field image at a plurality of light field projector devices by: generating light with an LED light source; directing the light from the light source into a single ray path; pixellating the light into a pixel array; magnifying the pixel array; and collimating the pixel array to create a collimated projected image; and displaying the collimated projected image to provide a light field image; and tiling the light field images created from the plurality of light field projectors to provide a tiled light field image.

In an embodiment, magnifying the pixel array at each of the plurality of light field projectors achieves overlap of the light field images from the plurality of light field projectors to provide a uniform tiled light field image.

In another embodiment, the method further comprises diffusing the collimated projected image before displaying the image.

In another embodiment, diffusing the collimated projected image comprises imparting an angular point spread function.

In another embodiment, the point spread function is described by a Gaussian function with a Full-Width at Half Maximum (FWHM) characterized by one or more parameters of the light field projector device.

In another embodiment, the method further comprises adjusting the ray path of one or more of the plurality of light field projector devices using an adjustment mechanism.

In another embodiment, the method further comprises adjusting the pixel pitch and hogel pitch to define the spatial resolution and depth of field of the display.

In another embodiment, the method further comprises adjusting the focal length of the display optical system.

In another aspect there is provided a light field projector device comprising: a light source; a projection optical system comprising: an illumination optical system comprising at least one lens to receive light from the light source and direct the light into a single ray path; a pixel forming device to receive light from the illumination optical system and convert the light into a pixel array; and a magnifying optical system; and a collimating optical system comprising a collimating optical component to collimate light from the pixel array received from the magnifying optical system and create a collimated projected image.

In an embodiment, the light source emits red, blue, and green light.

In another embodiment, the device comprises a plurality of light sources, the plurality of light sources together emitting red, blue, and green light.

In another aspect there is provided an light field image display device comprising: a plurality of light field projector devices arranged in an array, each projector device comprising: a light source; a projection optical system comprising: an illumination optical system comprising at least one lens to receive light from the light source and direct the light into a single ray path; a pixel forming device to receive light from the illumination optical system and convert the light into a pixel array; and a magnifying optical system; and a collimating optical system comprising a collimating optical component to collimate light received from the magnifying optical system and create a collimated projected image; and a display optical system positioned to receive the collimated projected image from the collimating optical system of at least one of the plurality of light field projector devices and display the image.

In an embodiment, the light source emits red, blue, and green light.

In another embodiment, the device comprises a plurality of light sources, the plurality of light sources together emitting red, blue, and green light.

In another aspect there is provided a method for creating a tiled light field image with a plurality of light field projector devices, the method comprising: creating a light field image at a plurality of light field projector devices by: generating light with an LED light source; directing the light from the light source into a single ray path; pixellating the light into a pixel array; magnifying the pixel array; and collimating the pixel array to create a collimated projected image; and displaying the collimated projected image to provide a light field image; and tiling the light field images created from the plurality of light field projectors to provide a tiled light field image.

In an embodiment, the light source emits red, blue, and green light.

In another embodiment, the plurality of light sources together emitting red, blue, and green light.

BRIEF DESCRIPTION OF THE DRAWINGS

These and other features of the invention will become more apparent in the following detailed description in which reference is made to the appended drawings.

FIG. 34A illustrates a projected image from an LED light source through a light field projector.

FIG. 34B illustrates the assignment of pixels in a projector frame for the active image, overlap area, and correction buffer.

DETAILED DESCRIPTION OF THE INVENTION

Figure 1:
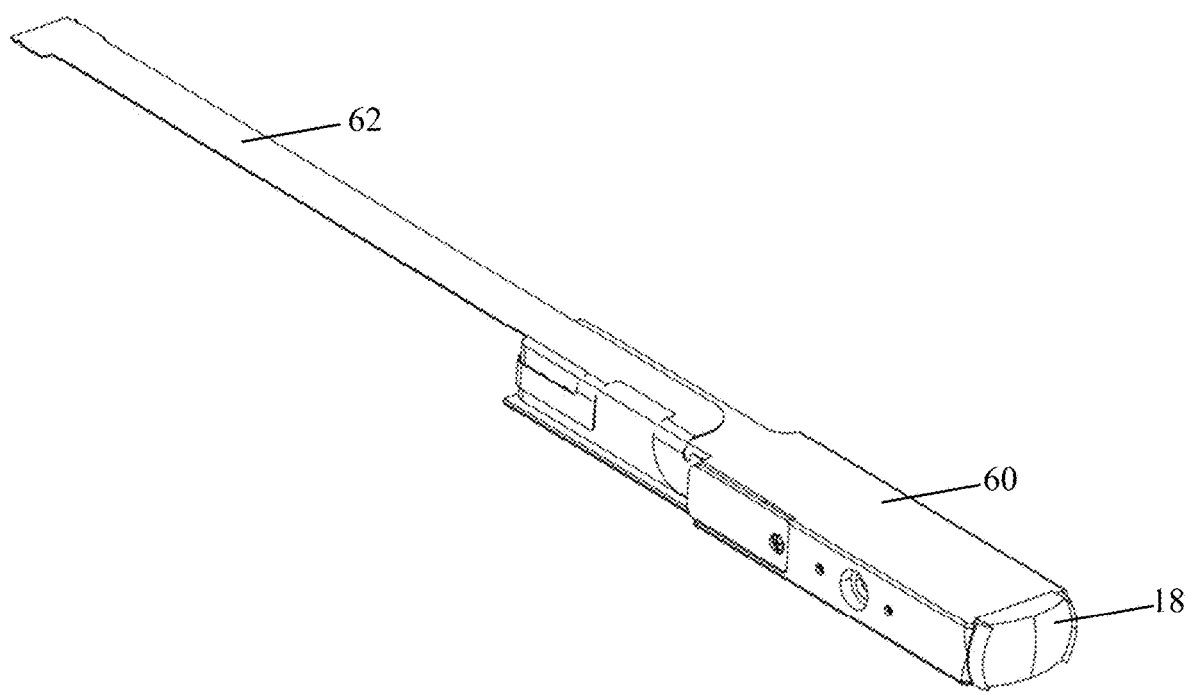
FIG. 1 illustrates an isometric view of a light field projector device according to an embodiment of the present disclosure.

To improve on current direct projection light field display designs, the present disclosure describes a projector specifically designed for creating a light field display to minimize pixel size, and optimize assembly, alignment, and display viewing parameters.

In an embodiment of the disclosure, a light field projection lens design is provided which leverages the design of the optic to fill the full aperture in front of the body. The image created by the light field projection lens has a small divergence to allow the projector images to overlap on the edges while still allowing the following optical architecture to create a light field.

Described herein is a light field projector device which can provide a light field display. The present light field projector device can be used for multiple-view, autostereoscopic, and high-angular resolution, light field display. The light field display may also be viewable with both horizontal and vertical parallax.

In operation, the light field projector device receives light from one or more light sources and directs the light using illumination optical devices onto a pixel forming device. The pixel forming device converts the light coming from the illumination optical devices into a plurality of pixels. The light coming into the pixel forming device originates from one or more light emitting diodes (LEDs) in the illumination optical system and is converted by the pixel forming device into a pixel array. Light from the pixel forming device then proceeds through a series of projection optical components or projection optics that function to magnify the image coming from the pixel forming device. Light from the projection optical system is then collimated. The collimation optical system makes a small image having a high pixel density and collimates the light, producing light rays with minimal, low, or no divergence. The display lens functions optimally when there is little or no divergent incoming light, accordingly the collimation optical system provides the substantially collimated light to the display lens in the display optical system.

Conventional projectors are generally configured to create a large image with coarse pixel density, for example, of around about 1 pixel per $mm^2$, assuming a typical projected image size and room size or distance to the projection screen. The present projector provides a much higher pixel density, on the order of 10,000 pixels per $mm^2$. The projection optics in the present system are designed with low magnification to overcome the tiling effect created by an image produced by multiple projection devices but without significant magnification as to interfere with the pixel density. To make a light field display, one needs to tile together light field image device outputs from multiple projector devices to create the full light field image. If the there is a break in the light field image between two projection images this can create a dark seam or interfaces between the outputs from each light device where no light is projected, creating a picket-fence like effect, with pickets between the output from each projection device. The presently described projector device overcomes the tiling issue by magnifying the image formed by the pixel forming device. By magnifying the image from the pixel forming device, the image at the output of the display optical system lens is thus at least as large as the physical dimensions of the projector itself, ensuring overlap between the light field images created by an array of projector devices. The projection optical system magnifies the light enough to overcome the tiling effect but not enough to sacrifice pixel density. A high pixel density is thus achieved, which is needed for a light field display. The human eye can only resolve pixel sizes of about to 35 microns, assuming good visual acuity and optimal viewing conditions. Without a display lens, the pixel densities achieved by the presently described projector are higher than that which can be resolved by the human eye, on the order of 10 microns. Accordingly, the image created by the present projector device looks fluid, crisp, and unpixellated.

Generally, very high-brightness projectors are required for light field displays known in the art. One advantage of the presently described light field projector device is a reduced brightness requirement for the projector itself. The reduced brightness requirement of the presently described projector is achieved through the design of the light field projector device's optical systems' ability to control the angular distribution of light and application of a point spread function to the light beam. The ability to control the angular distribution of light and the applied point spread function ensure efficient light output with minimal loss. The decreased brightness requirement may allow for use of small LEDs without an internal cooling requirement, leading a smaller overall footprint of the device. If two or more light field projectors of the presently described design are used in combination with one another, a tighter packing density may also be achieved. The decreased size and weight of the individual projector devices can also result in decreased power requirements for the direct projection light field display.

The concept of an observer-based function based on light in space and time, or plenoptic function, was developed to describe visual stimulation perceived by vision systems. The plenoptic illumination function or plenoptic function is an idealized function used in computer vision and computer graphics to express the image of a scene from any possible viewing position at any viewing angle at any point in time. The basic variables of the plenoptic function are dependent upon include the 3D coordinates (x,y,z) from which light is being viewed, and the direction light approaches this viewing location as described by the angles (θ, φ). With wavelength of the light, λ and time of the observation, t, this results in the plenoptic function:

$$P(x,y,z,\theta,\phi,\lambda,t)$$

As an alternative to the plenoptic function, the radiance along light rays in 3D space at a point and given direction may be used and represented by a light field. The definition of a light field may be equivalent to that of the plenoptic function. A light field may be described as radiance flowing through all points in all possible directions, as a 5D function. For a static light field, the light field may be represented as a scalar function:

$$L(x,y,z,\theta,\phi)$$

where (x, y, z) represent the radiance as a function of location and the light direction of travel is characterized by (θ, φ).

A viewer of a 3D real world object is subject to infinite views, or a continuously distributed light field. To practically replicate this, the present disclosure describes a light field projector display device capable of subsampling the continuously distributed light field into a finite number of views, or multiple views, to approximate the light field. The output of the light field projector device is a light field image, which is a 3D representation of a continuously distributed light field based upon a finite number of views with angular resolution meeting or exceeding that of the human eye. A light field can also be thought of as a vector function that describes the amount of light flowing in every direction through every point in space.

Projector array-based displays can pose a challenge for design, at least due to the requirement for inclusion of many densely oriented projectors into a small space with precise alignment. The presently described orientation of optical components within a projector base in combination with multiple optical systems for collimation and diffusion of light can achieve a reduced pixel size, minimum projector footprint, a fully scalable design to larger displays, reduced tolerance constraint, and decreased chromatic aberration from a multiple optical system light field display design.

One or more parameters of the light field display comprise one or more of: hogel pitch, pixel pitch, and focal length. The term pixel references a set of red, green, and blue subpixels. The pixel pitch is defined as the distance from the center of one pixel to the center of the next. As used herein, a pixel array refers to an array of pixels inside a hogel. A hogel is an alternative term for a holographic pixel, which is a cluster of traditional pixels with directional control. An array of hogels can generate a light field. It then follows that the hogel pitch is defined as the distance from the center of one hogel to the center of an adjacent hogel. The angular field of view for a lens is defined by its focal length. Generally, a shorter focal length results in a wider field of view. It should be noted that the focal length is measured from the rear principal plane of a lens. The rear principal plane of the lens is rarely located at the mechanical back of an imaging lens. Due to this, approximations and the mechanical design of a system are generally calculated using computer simulation.

Various features of the invention will become apparent from the following detailed description taken together with the illustrations in the Figures. The design parameters, design method, construction, and use of the light field projector device and structures disclosed herein are described with reference to various examples representing embodiments which are not intended to limit the scope of the invention as described and claimed herein. The skilled technician in the field to which the invention pertains will appreciate that there may be other variations, examples and embodiments of the invention not disclosed herein that may be practiced according to the teachings of the present disclosure without departing from the scope of the invention.

Definitions

Unless defined otherwise, all technical and scientific terms used herein have the same meaning as commonly understood by one of ordinary skill in the art to which this invention pertains.

The use of the word "a" or "an" when used herein in conjunction with the term "comprising" may mean "one," but it is also consistent with the meaning of "one or more," "at least one" and "one or more than one."

As used herein, the terms "comprising," "having," "including," and "containing," and grammatical variations thereof, are inclusive or open-ended and do not exclude additional, unrecited elements and/or method steps. The term "consisting essentially of" when used herein in connection with a composition, device, article, system, use, or method, denotes that additional elements and/or method steps may be present, but that these additions do not materially affect the manner in which the recited composition, device, article, system, method, or use functions. The term "consisting of" when used herein in connection with a composition, device, article, system, use, or method, excludes the presence of additional elements and/or method steps. A composition, device, article, system, use, or method described herein as comprising certain elements and/or steps may also, in certain embodiments consist essentially of those elements and/or steps, and in other embodiments consist of those elements and/or steps, whether or not these embodiments are specifically referred to.

As used herein, the term "about" refers to an approximately +/−10% variation from a given value. It is to be understood that such a variation is always included in any given value provided herein, whether or not it is specifically referred to.

The recitation of ranges herein is intended to convey both the ranges and individual values falling within the ranges, to the same place value as the numerals used to denote the range, unless otherwise indicated herein.

The use of any examples or exemplary language, e.g. "such as", "exemplary embodiment", "illustrative embodiment", and "for example" is intended to illustrate or denote aspects, embodiments, variations, elements, or features relating to the invention and not intended to limit the scope of the invention.

As used herein, the terms "connect" and "connected" refer to any direct or indirect physical association between elements or features of the present disclosure. Accordingly, these terms may be understood to denote elements or features that are partly or completely contained within one another, attached, coupled, disposed on, joined together, in communication with, operatively associated with, etc., even if there are other elements or features intervening between the elements or features described as being connected.

As used herein, the term "pixel" refers to a spatially discreet light emission mechanism used to create a display.

As used herein, the term "subpixel" refers to a structure having a light emitting device housed within an optical microcavity. The optical microcavity is operatively associated with a plurality of reflective surfaces to substantially collimate, manipulate, or tune the light. At least one of the reflective surfaces is a light propagating reflective surface connected to the optical microcavity to propagate the light out of the microcavity. The present disclosure provides for individually addressable red, green, and blue (RGB) subpixels. The subpixel size as presently described is in a nanoscale to several microns range, which is significantly smaller than the pixel size previously known in the art.

As used herein, the term "light field" at a fundamental level refers to a function describing the amount of light flowing in every direction through points in space, free of occlusions. Therefore, a light field represents radiance as a function of position and direction of light in free space. A light field can be synthetically generated through various rendering processes or may be captured from a light field camera or from an array of light field cameras.

As used herein, the term "light field display" is a device which reconstructs a light field from a finite number of light field radiance samples input to the device. The radiance samples comprise the color components red, green and blue (RGB) which originate from LEDs of the same color. For reconstruction in a light field display, a light field can also be understood as a mapping from a four-dimensional space to a single RGB color. The four dimensions include the vertical and horizontal dimensions of the display and two dimensions describing the directional components of the light field. A light field is defined as the function:

$$LF:(x,y,u,v) \to (r,g,b)$$

For a fixed point $x_f$, $y_f$ in the light field, $LF(x_f,y_f,u,v)$ represents a two dimensional (2D) image referred to as an "elemental image". The elemental image is a directional image of the light field from the fixed $x_f$, $y_f$ position. When a plurality of elemental images are connected side by side, the resulting image is referred to as an "integral image". The integral image can be understood as the entire light field required for the light field display.

As used herein, the acronym "FWHM" refers to 'Full-Width at Half Maximum', which is an expression of the extent of a function given by the difference between the two extreme values of the independent variable at which the dependent variable is equal to half of its maximum value.

As used herein, the term "hogel" is an alternative term for a holographic pixel, which is a cluster of traditional pixels with directional control. An array of hogels can generate a light field. As a pixel describes the spatial resolution of a two-dimensional display, a holographic pixel or hogel describes the spatial resolution of a three-dimensional display.

As used herein, the term "hogel pitch" refers to the distance from the center of one hogel to the center of an adjacent hogel.

As used herein, the term "optical mirror" refers to an object that reflects light in such a way that, for incident light in some range of wavelengths, the reflected light preserves many or most of the detailed physical characteristics of the original light. This can also be called specular reflection. Two or more mirrors aligned exactly parallel and facing each other can give an infinite regress of reflections, called an infinity mirror effect.

As used herein, the term "pixel pitch" refers to the distance from the center of one pixel to the center of the next.

As used herein, the term "pixel array" refers to an array of pixels, which are optionally inside a hogel.

As used herein, the term "wavelength" is a measure of distance between two identical peaks (high points) or troughs (low points) in a wave, which is a repeating pattern of traveling energy such as light or sound.

As used herein, the term "simulation" refers to a computer model of an object or physical phenomenon. A simulation can be used for the purpose of study or to develop and refine fabrication specifications. Various simulation methods can be used, including but not limited to the following: Finite difference time domain (FDTD), ray tracing, Finite Element Analysis (FEA), and Finite Element Method (FEM).

It is contemplated that any embodiment of the compositions, devices, articles, methods and uses disclosed herein can be implemented by one skilled in the art, as is, or by making such variations or equivalents without departing from the scope of the invention.

Design Methodology

A light field display requires the smallest achievable pixel size to increase the spatial and/or directional resolution of the display. For a light field projector used in a direct projection light field display, the pixel size is determined by the projected image size of the active area at the projectors focus distance, where the total space of a single projector must be the same as the image dimensions. If the pixel fills the entire space it resides in, then the spacing between pixels, or pixel pitch, is equal to the pixel size. The parameters pixel pitch and hogel pitch define the viewer experience as they determine the spatial resolution and depth of field of the display. The smaller the hogel pitch the higher the spatial resolution of the light field display. The larger the number of pixels within a hogel, the higher the depth of field of the display. Increasing the density of the pixels gives the designer the ability to achieve different light field display designs based on application, for example to increase the depth of field by increasing the hogel pitch, decreasing the spatial resolution.

To achieve a small pixel size, the space occupied by a single projector can be minimized. One method of minimizing the projector footprint is a direct mounting strategy where the projector body in the array of projectors mounts directly to a chassis leaving minimal space between adjacent projectors as illustrated in FIG. 34B. The projector footprint is then as close as possible to the dimensions the display device used in the projector. Direct mounting of the projector results in no mechanical method of adjusting the alignment of the projectors in the display, necessitating a digital projector correction method such that an additional number of correction pixels 94 is allowed outside the active area of each projector. These correction pixels 94 allow for offsetting the projector frame in both x- and y-dimensions of the display device to correct for misalignment in the 6 degrees of freedom.

The number of pixels required for correction is directly related to the mechanical design of the projector array system, where mounting the projectors with the smallest possible tolerances results in the smallest number of correction pixels 94 required. An example of digital correction divides the pixels in a single projector frame into the light field image, overlap pixels 92, and the correction buffer. The correction buffer is determined based on the defined tolerances of the projector array, and the maximum misalignment in pixels. If the full projector image resolution is 2048× 1080, for example, the pixels in the projector image can be divided such that the projector light field image 24 has a resolution of 1944×1000, with a 20 pixel overlap with the adjacent projectors. The overlap pixels 92 display duplicate data with the adjacent projectors with an applied intensity function for blending of the tiled display. The resolution of the light field frame and overlap pixels 92 is 1984×1040 pixel and must also account for increase in the image size due to optical corrections, such as distortion and chromatic aberration. This 1984×1040 resolution image is offset from the center of the display device, within the 2048×1080 to allow for the correction per-projector misalignment, equivalent to 64 pixels in the x-direction, and 40 pixels in the y direction. In this example, the maximum projector footprint is calculated as the light field projector resolution multiplied by the equivalent pixel size in the light field display.

An outline of the projector and display calibration procedure is presented. A calibration file, related to a specified white point for the display, is first generated for each projector by characterizing the projector output through the entire color range of the display. The calibration of each projector alters the LED voltage, current, and mixing ratio to achieve a color uniformity across the display while also ensuring that the intensity for each color step is within the specified tolerance value. The projector calibration can be performed with the projectors installed in the display or using individual projectors before installation using a calibrated imaging device such as a photometer, colorimeter, or Digital Single-Lens Reflex Camera (DSLR). During this stage, optical corrections for distortion, warping, or other projector-based quantities can be applied.

In the next step, the display optical system must be installed in the display system such that any intensity non-uniformities can be corrected. Depending on the number of lenses and optical quality of the optics this step may not be required.

With the light field projector device installed into the display, the projector digital offset can be determined and set before display characterization and correction. The light field projector frame is illuminated in each projector and the digital offset can be automatically determined through an iterative process using a DSLR. Each projector requires an independent set of values. With the offset values determined, the additional pixels in the projector assigned for overlap with adjacent projectors are illuminated. A default coefficient set is assigned to each projector, noting different coefficients for the outside edge projectors. The coefficients are then updated in an automated procedure to achieve the required blending.

The final step is light field display calibration, which is used to measure a pixel-to-pixel correspondence from the projector pixel to the light field pixel.

FIG. 1 illustrates an isometric pictorial of the light field projector device. All optical components can be contained within projector housing 60, or any other housing or structure that secures the components. A light field image created by a set of LEDs in a projection optical system is projected through the collimating optical system 18 which comprises a light field projection lens. The light field projector device shown also includes a flexible printed circuit (FPC) 62, also referred to as the light field projector flex cable, to connect the light field projector device and light sources to the drive electronics. The light field projector body serves to house as well as secure the optical components in the projector device. Alternative projector body configurations can comprise one or more single surface or structure to which the optical components can be secured or held in place.

Figure 2:
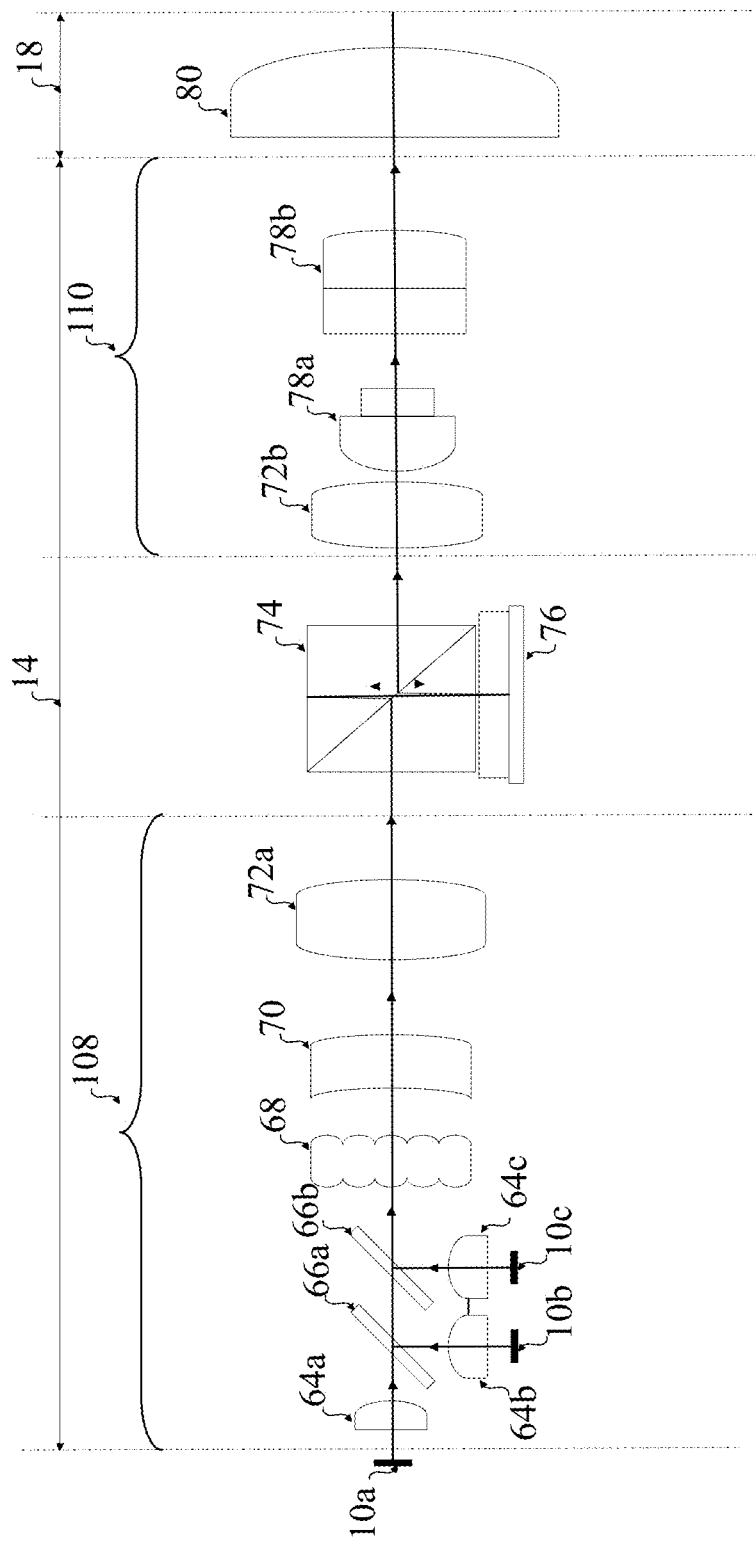
FIG. 2 illustrates a configuration of a projection optical system arrangement and a collimating optical system.

FIG. 2 illustrates a configuration of the projection optical system 14 and collimating optical system 18 which are housed in a light field projector body as illustrated in FIG. 1. In this configuration, light emitted from a series of three light emitting diodes (LEDs) 10*a*, 10*b*, 10*c*, is directed to a projection optical system 14. LED 10*a* emits green light, LED 10*b* emits red light, and LED 10*c* emits blue light. Each LED can be a single LED or can alternatively be multiple LEDs of the same color, arranged in an array or other configuration. The projection optical system 14 shown has, in an illumination optical system 108, a series of plano-convex lenses 64*a*, 64*b*, 64*c*, a series of two dichroic mirrors 66*a*, 66*b*, a microlens array 68, a meniscus lens 70, and a first bi-convex lens 72*a*. There are three plano-convex lenses 64*a*, 64*b*, 64*c*, one for each of LEDs 10*a*, 10*b*, 10*c*, respectively, through which light from the respective LEDs is directed. The three individual ray paths originating from the three LEDs 10*a*, 10*b*, 10*c* are then directed through a series of two dichroic mirrors 66*a*, 66*b*, and merged to form a single ray path. Dichroic mirror 66*a* allows transmission of green light from LED 10*a* and reflection of red light transmitted from LED 10*b*. Similarly, dichroic mirror 66*b* allows transmission of green and red light from LEDs 10*a* and 10*b*, and reflection of blue light transmitted from LED 10*c*. The red, green, and blue light are thereby merged to form a single ray path of light. The single ray path of light then travels through a microlens array 68 through to a meniscus lens 70, followed by a first bi-convex lens 72*a* and through to a folded prism 74. The ray path through the folded prism 74 is directed to a pixel forming device 76. The pixel forming device 76 can be, for example, a Liquid Crystal on Silicon (LCOS) panel, a digital micromirror device (DMD), or other display device. The ray path then proceeds back through the folded prism 74 to a magnifying optical system 110 comprising a second bi-convex lens 72*b* and series of projection doublets 78*a*, 78*b*. The bi-convex lenses may be formed of, e.g., Zeonex® E48R, glass, cyclic olefin polymer (COP), PMMA, polystyrene, isoplast, optical polyester, acrylic, polyetherimide (PEI), or other suitable materials. The projection doublets 78*a*, 78*b* function to create a projected image by receiving a small image from the display device and magnifying it. Doublets are generally used to minimize any bad effects by making the image larger. The projection doublets 78*a*, 78*b* can comprise two lenses of different properties i.e. material and curvature. Lens doublets are used to minimize optical aberrations. The ray path then continues to the collimating optical system 18, which in this embodiment is a plano-convex lens 80. The function of plano-convex lens 80 in the collimating optical system 18 is for collimation of light coming from the projection optical system 14.

Figure 3:
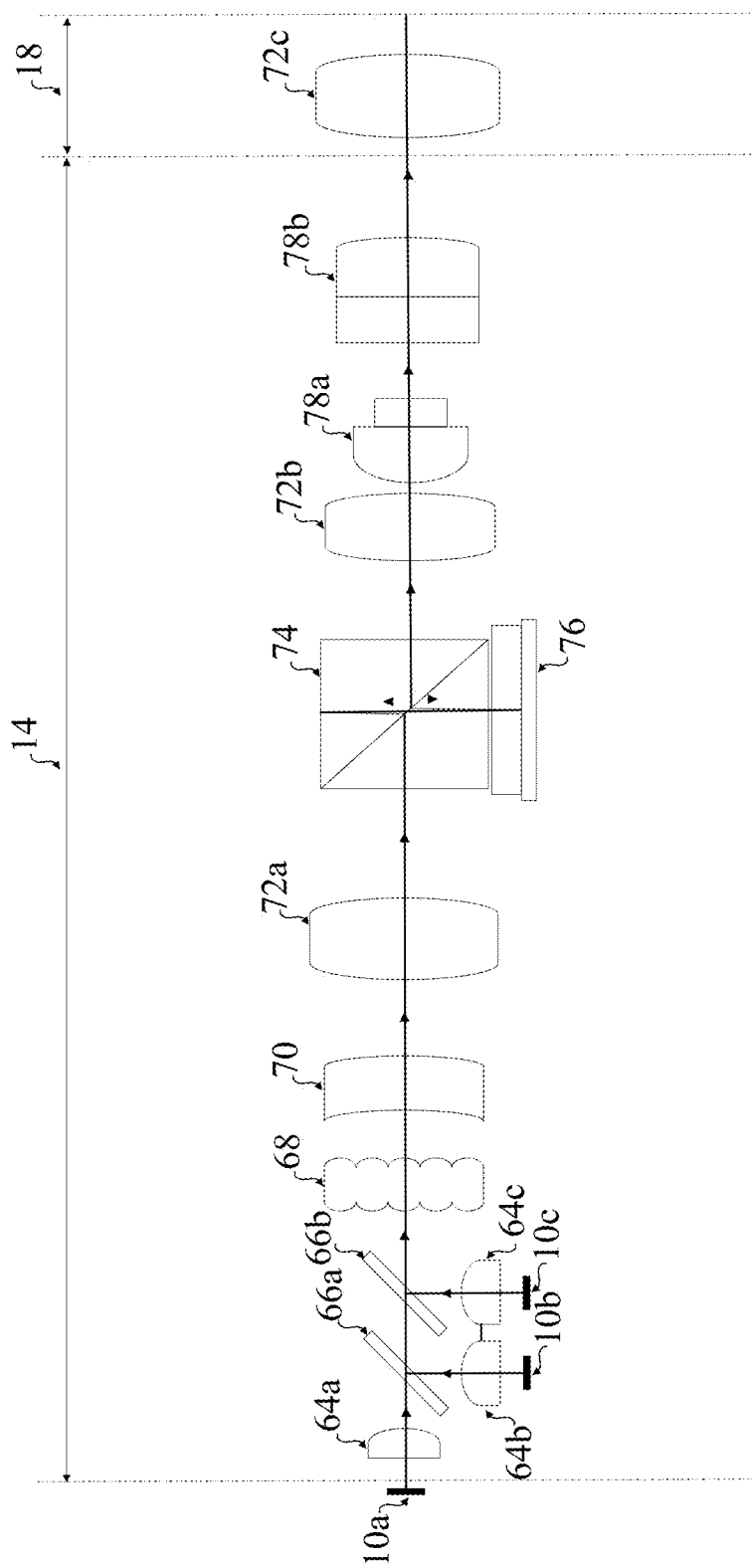
FIG. 3 illustrates a configuration of the projection optical system arrangement and an alternative collimating optical system.

FIG. 3 illustrates a series of optical systems with the projection optical system 14 arrangement as shown in FIG. 2 and directing the light ray path to a collimating optical system 18, wherein the collimating optical system 18 is composed of a bi-convex lens 72. Projection optical system 14 and collimating optical system 18 are housed in the light field projector body, as illustrated in FIG. 1. In this configuration, light emitted from a green LED 10*a*, red LED 10*b*, and blue LED 10*c* is directed to a projection optical system 14. The projection optical system 14 shown has a series of three plano-convex lenses 64*a*, 64*b*, 64*c*, one for each of LEDs 10*a*, 10*b*, 10*c*, respectively, through which light from the respective LEDs is directed. The three individual ray paths originating from the three LEDs 10*a*, 10*b*, 10*c* are then directed through a series of two dichroic mirrors 66*a*, 66*b* and merged to form a single ray path. Dichroic mirror 66*a* allows transmission of green light from LED 10*a* and reflection of red light transmitted from LED 10*b*. Similarly, dichroic mirror 66*b* allows transmission of green and red light from LEDs 10*a* and 10*b*, and reflection of blue light transmitted from LED 10*c*. The red, green, and blue light are thereby merged to form a single ray path of light. The light then travels through, in order, a microlens array 68, a meniscus lens 70, a first bi-convex lens 72*a*, and a folded prism 74. The ray path through the folded prism 74 is directed to a pixel forming device 76. The pixel forming device 76 can be, for example, a Liquid Crystal on Silicon (LCOS) panel, a digital micromirror device (DMD), or other display device. The ray path then proceeds back through the folded prism 74 to a second bi-convex lens 72*b* and through to a series of projection doublets 78*a* and 78*b*. The ray path then continues to the collimating optical system 18, which in this embodiment comprises another bi-convex lens 72*c*.

Figure 4:
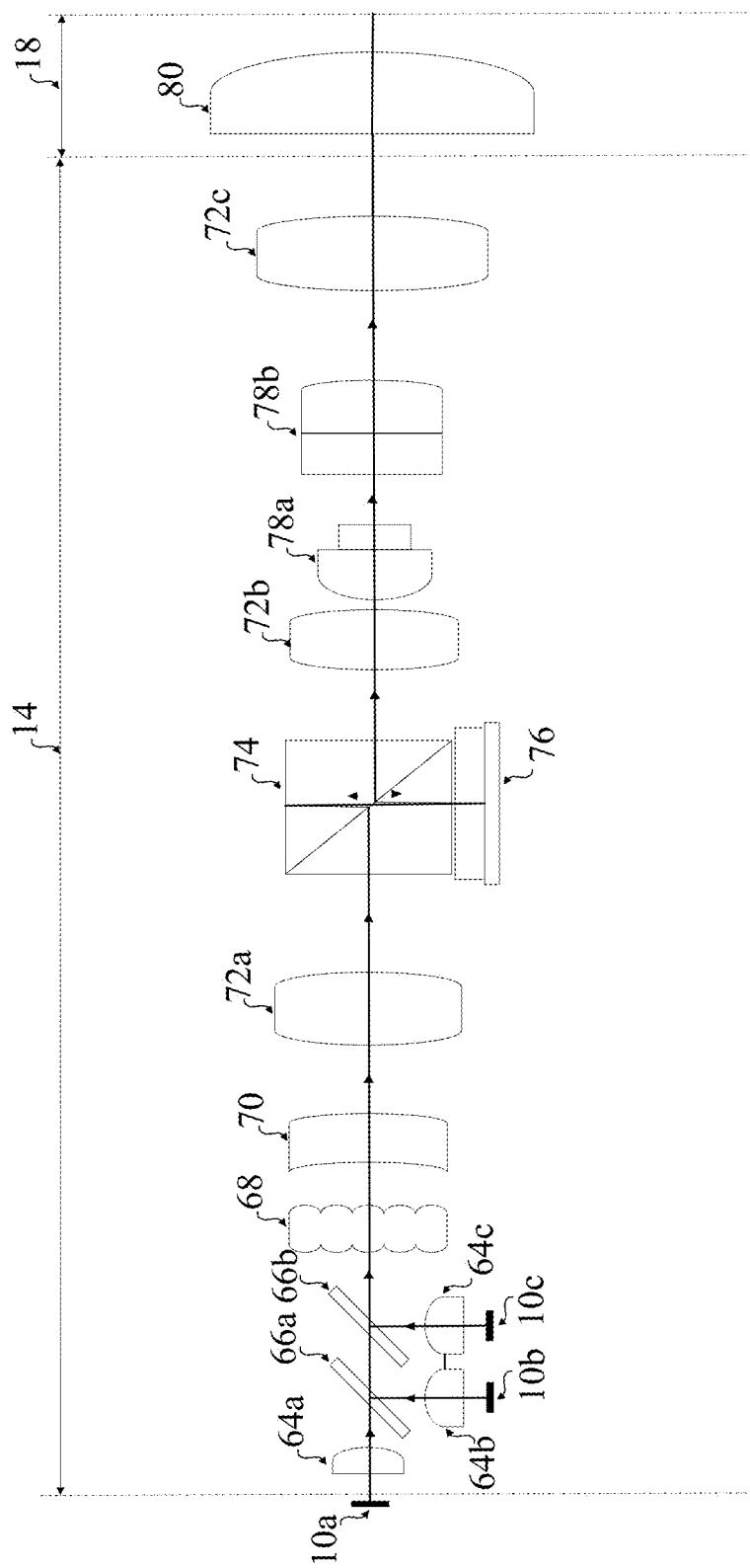
FIG. 4 illustrates a configuration of the projection optical system arrangement and an alternative collimating optical system.

FIG. 4 illustrates a projection optical system 14 arrangement as shown in FIG. 2 and directing the light ray path to a collimating optical system 18, wherein the collimating optical system 18 is composed of a bi-convex lens 72 and a plano-convex lens 80. Projection optical system 14 and collimating optical system 18 are housed in the light field projector body, as illustrated in FIG. 1. As shown, light emitted from a green LED 10*a*, red LED 10*b*, and blue LED 10*c* is directed to a projection optical system 14. The projection optical system 14 shown has a series of three plano-convex lenses 64*a*, 64*b*, 64*c*, one for each of LEDs 10*a*, 10*b*, 10*c*, respectively, through which light from the respective LEDs is directed. The three individual ray paths originating from the three LEDs 10*a*, 10*b*, 10*c* are then directed through a series of dichroic mirrors 66*a*, 66*b* and merged to form a single ray path. Dichroic mirror 66*a* allows transmission of green light from LED 10*a* and reflection of red light transmitted from LED 10*b*. Similarly, dichroic mirror 66*b* allows transmission of green and red light from LEDs 10*a* and 10*b*, and reflection of blue light transmitted from LED 10*c*. The red, green, and blue light are thereby merged to form a single ray path of light. The light then travels through, in order, a microlens array 68, a meniscus lens 70, a first bi-convex lens 72*a*, and a folded prism 74. The ray path through the folded prism 74 is directed to a pixel forming device 76. The pixel forming device 76 can be, for example, a Liquid Crystal on Silicon (LCOS) panel, a digital micromirror device (DMD), or other display device. The ray path then proceeds back through the folded prism 74 to a second bi-convex lens 72*b* and through to a series of projection doublets 78*a* and 78*b*. The ray path then continues on to the collimating optical system 18, which in this embodiment is a third bi-convex lens 72*c* followed by a plano-convex lens 80 along the ray path.

Figure 5:
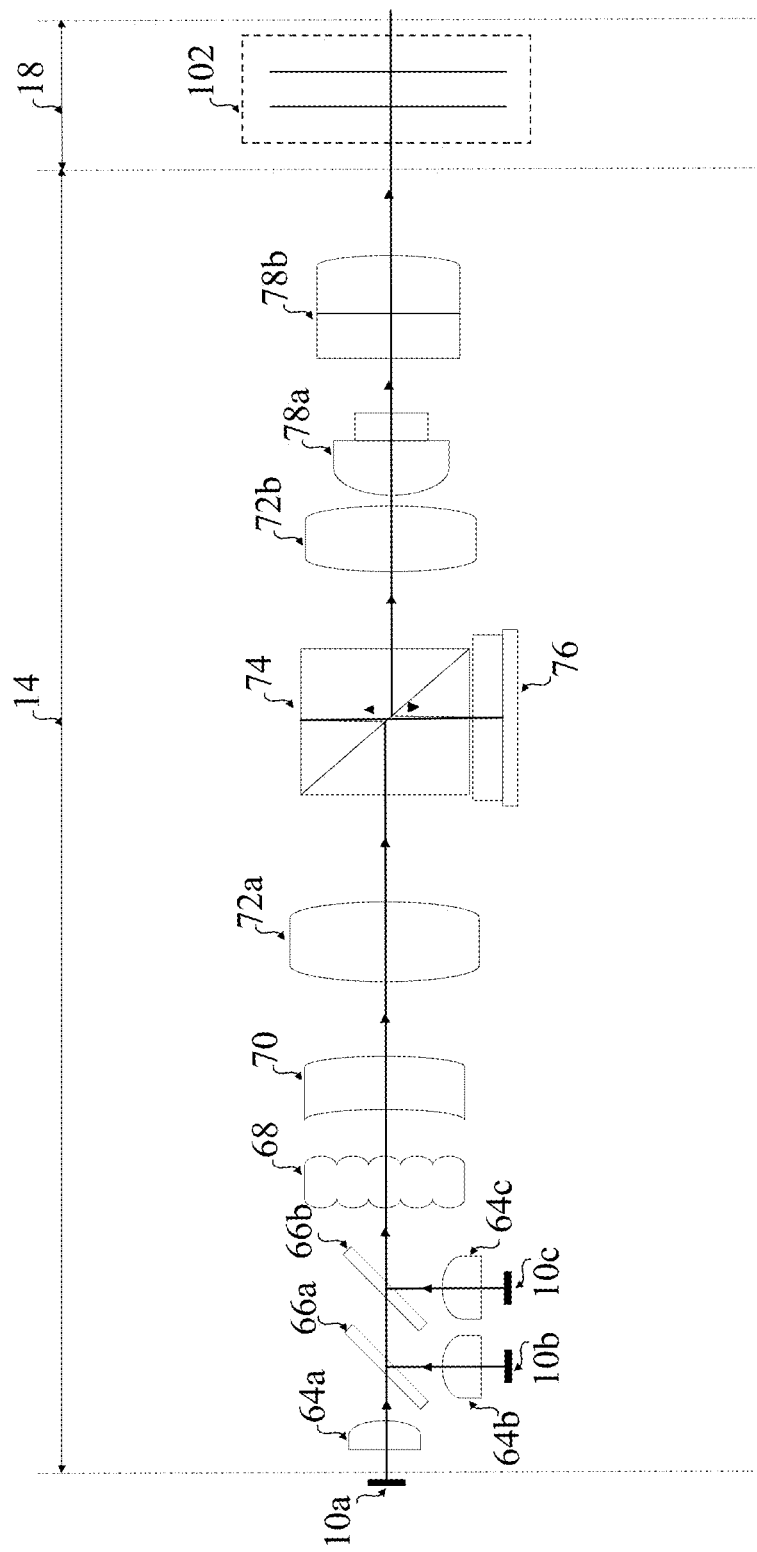
FIG. 5 illustrates a configuration of the projection optical system arrangement and an alternative collimating optical system.

FIG. 5 illustrates a projection optical system 14 arrangement as shown in FIG. 2 and directing the light ray path to a collimating optical system 18, wherein the collimating optical system 18 is composed of two or more optical components. Projection optical system 14 and collimating optical system 18 are housed in the light field projector body, as illustrated in FIG. 1. In this embodiment, light emitted from a green LED 10*a*, red LED 10*b*, and blue LED 10*c* is directed to a projection optical system 14. The projection optical system 14 shown has a series of three plano-convex lenses 64*a*, 64*b*, 64*c*, one for each of LEDs 10*a*, 10*b*, 10*c*, respectively, through which light from the respective LEDs is directed. The three individual ray paths originating from the three LEDs 10*a*, 10*b*, 10*c* are then directed through a series of dichroic mirrors 66*a*, 66*b* and merged to form a single ray path. Dichroic mirror 66*a* allows transmission of green light from LED 10*a* and reflection of red light transmitted from LED 10*b*. Similarly, dichroic mirror 66*b* allows transmission of green and red light from LEDs 10*a* and 10*b*, and reflection of blue light transmitted from LED 10*c*. The red, green, and blue light are thereby merged to form a single ray path of light. The light then travels through, in order, a microlens array 68, a meniscus lens 70, a first bi-convex lens 72*a*, and a folded prism 74. The ray path through the folded prism 74 is directed to a pixel forming device 76. The pixel forming device 76 can be, for example, a Liquid Crystal on Silicon (LCOS) panel, a digital micromirror device (DMD), or other display device. The ray path then proceeds back through the folded prism 74 to a second bi-convex lens 72*b* and through to a series of projection doublets 78*a* and 78*b*. The ray path then continues on to the collimating optical system 18, which in this embodiment comprises one or more collimating optical component 102. The one or more collimating optical component 102 in the collimating optical system 18 function to collimate the incoming light and can include but are not limited to one or more components such as optical diffusers and lenses of one or more different lens types, such as a biconvex lenses and plano lenses.

Figure 6:
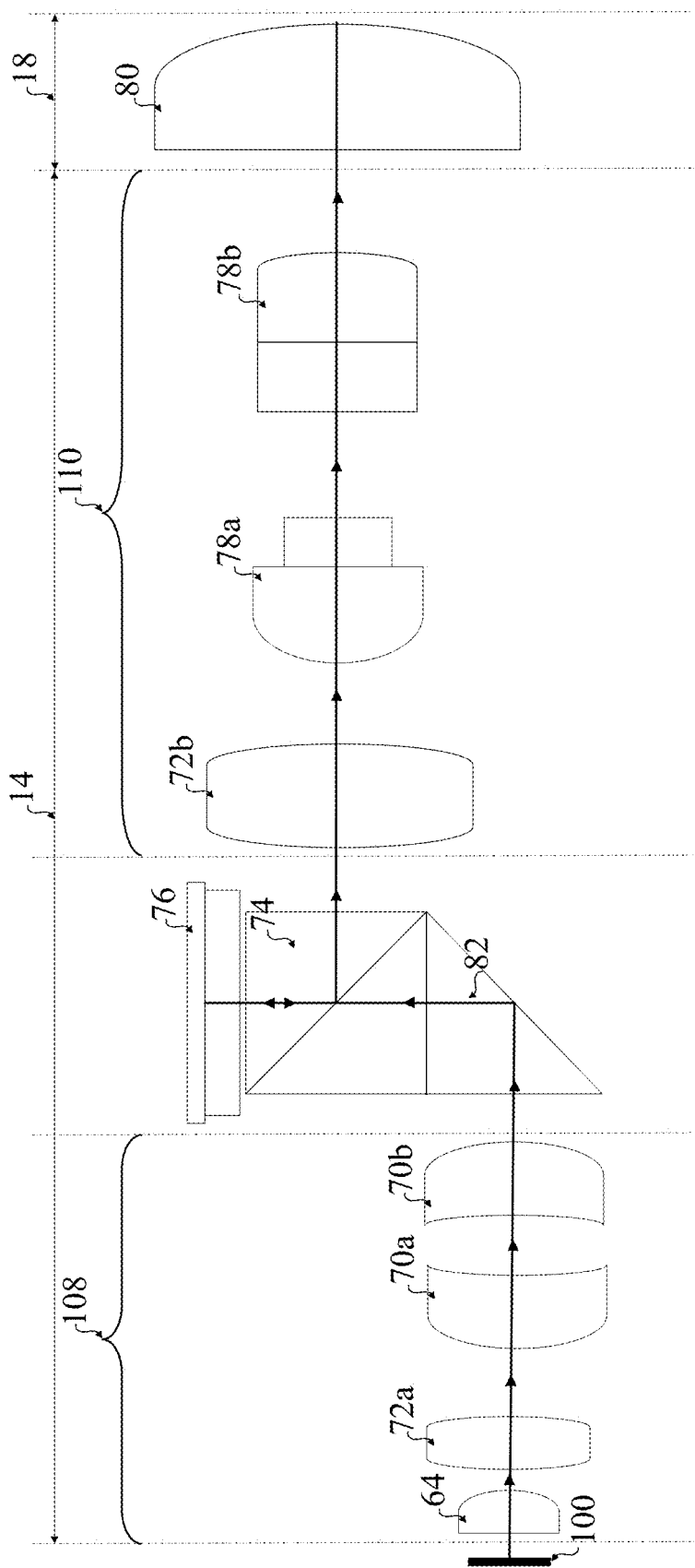
FIG. 6 illustrates a configuration of a projection optical system arrangement and a collimating optical system.

FIG. 6 illustrates an alternative configuration of a projection optical system 14 and a collimating optical system 18 which are incorporated and housed in a light field projector body, as illustrated in FIG. 1. In this configuration, light emitted from light source in LED package 100 is directed to the projection optical system 14. The LED package 100 can be comprised of one or more LEDs which produce a plurality of light rays which are directed into the projection optical system 14. When the LED package 100 has a plurality of LEDs, the plurality of LEDs are preferably arranged in an array or closely-packed configuration so that the light emitted from the LED package 100 is relatively focused and of small diameter. LED package 100 can also comprise LEDs of one or more colors depending on the system design. Preferably LED package 100 comprises at least three LEDs, one each of green, red, and blue. The projection optical system 14 is composed of an illumination optical system 108 which receives light from the LED package 100. First, light is received from LED package 100 to the illumination optical system 108. The illumination optical system comprises plano-convex lens 64, a first bi-convex lens 72a, followed by a pair of meniscus lenses 70a, 70b. The ray path is then directed through to a single prism 82. The ray path through prism 82 is then directed to a folded prism 74 and pixel forming device 76, which is preferably a digital micromirror device (DMD) then back through the folded prism 74. The light ray path continues through a magnifying optical system 110 having a second bi-convex lens 72b followed by a series of projection doublets 78a, 78b. The ray path then continues to the collimating optical system 18, which, in this embodiment, is a plano-convex lens 80. The function of plano-convex lens 80 is for collimation of the light beam.

Figure 7:
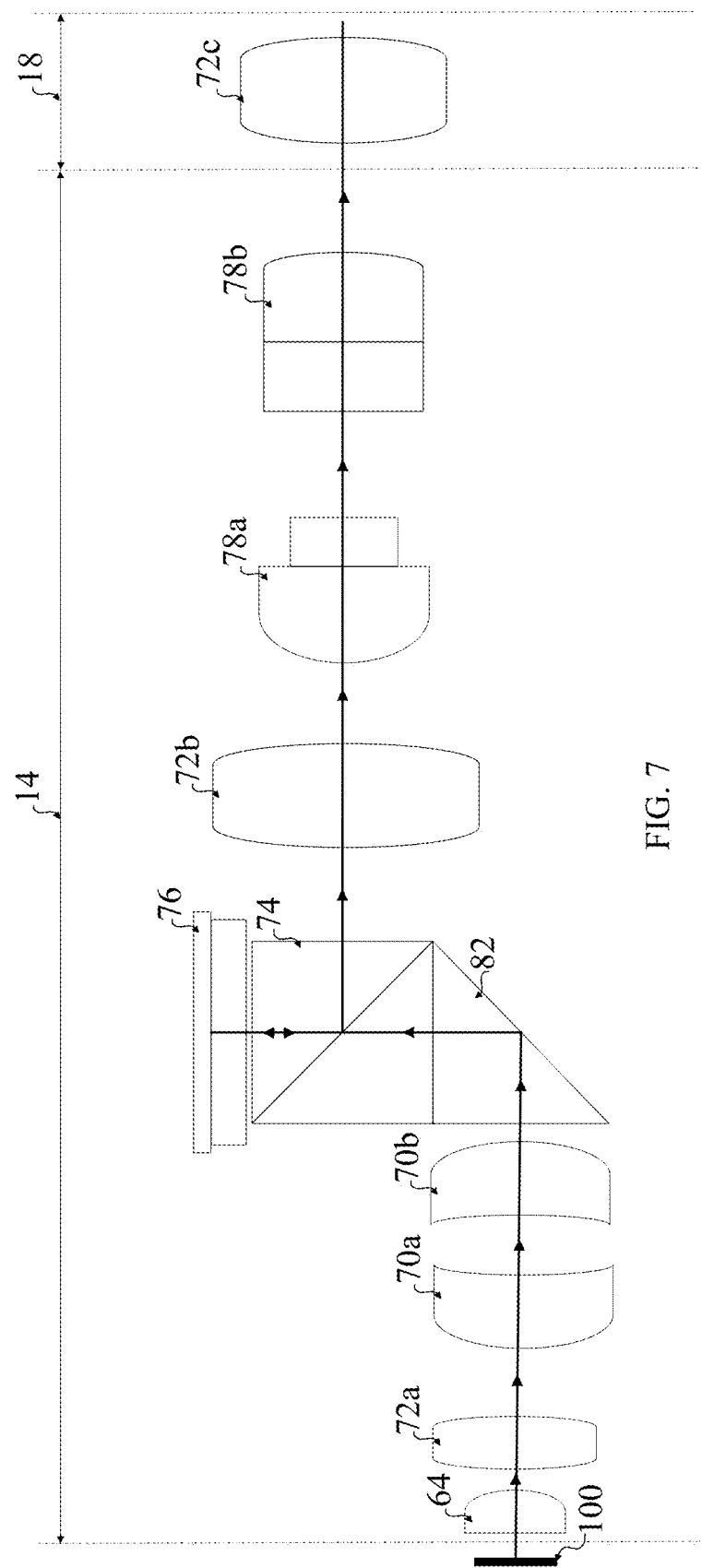
FIG. 7 illustrates an alternative configuration of the projection optical system arrangement and an alternative collimating optical system.

FIG. 7 illustrates the projection optical system 14 arrangement as shown in FIG. 6 directing a light ray path to a collimating optical system 18 wherein the collimating optical system 18 is composed of a bi-convex lens 72. In this configuration, light emitted from LED package 100 is directed to the projection optical system 14. The projection optical system 14 is composed of a plano-convex lens 64, in which light from LED package 100 is directed. The ray path is then directed to a first bi-convex lens 72a followed by a pair of meniscus lenses 70a, 70b, and then through to a single prism 82. The ray path through prism 82 is then directed to a folded prism 74 and pixel forming device 76, then back through the folded prism 74 and through to a second bi-convex lens 72b followed by a series of projection doublets 78a, 78b. The ray path then continues to the collimating optical system 18, which, in this embodiment, is a bi-convex lens 72. The function of bi-convex lens 72 is for collimation of the light beam.

Figure 8:
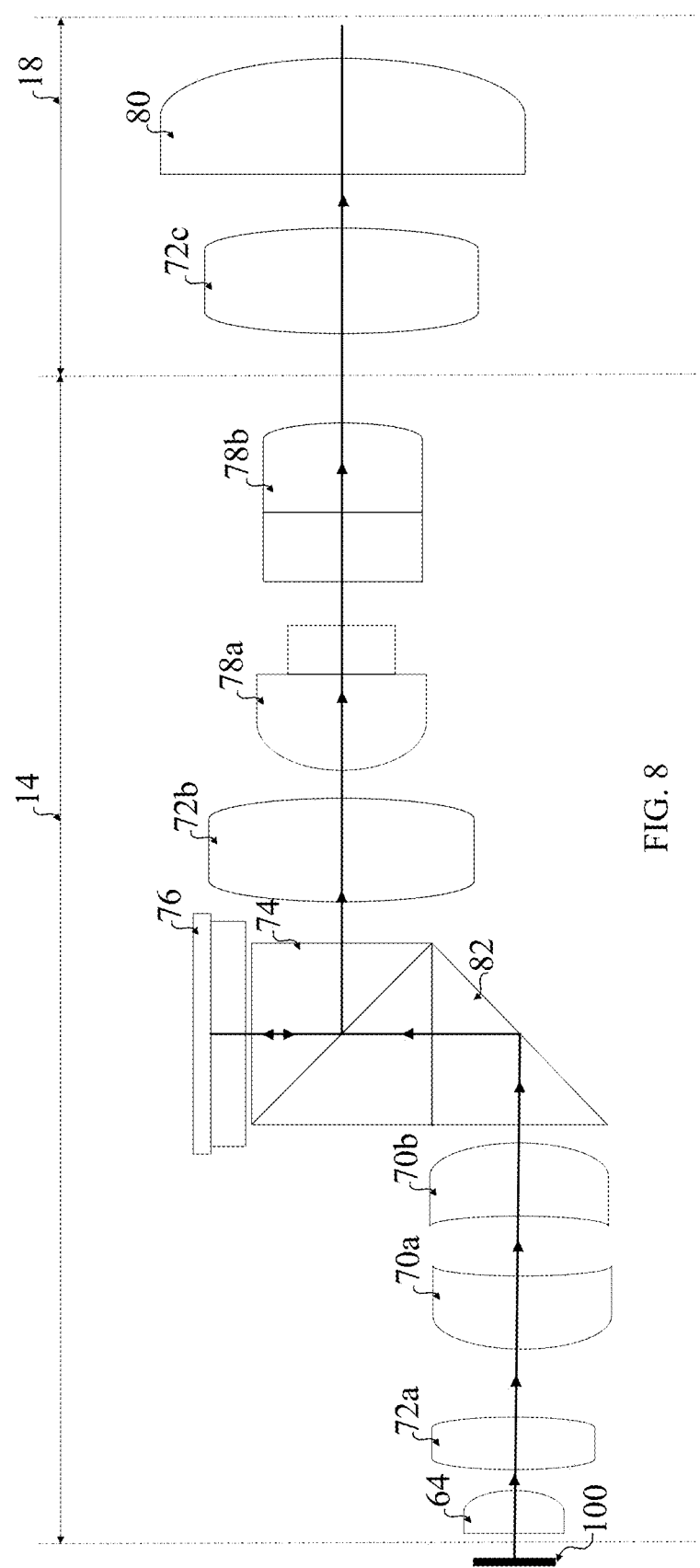
FIG. 8 illustrates a configuration of the projection optical system arrangement and an alternative collimating optical system.

FIG. 8 illustrates the projection optical system 14 arrangement as shown in FIG. 6 directing a light ray path to the collimating optical system 18 wherein the collimating optical system 18 is composed of a bi-convex lens 72 and a plano-convex lens 80. In this configuration, light emitted from LED package 100 is directed to the projection optical system 14. The projection optical system 14 is composed of a plano-convex lens 64, in which light from LED package 100 is directed. The ray path is then directed to a first bi-convex lens 72a followed by a pair of meniscus lenses 70a, 70b, and then through to a single prism 82. The ray path through prism 82 is then directed to a folded prism 74 and pixel forming device 76, then back through the folded prism 74 and through to a second bi-convex lens 72b followed by a series of projection doublets 78a, 78b. The ray path then continues to the collimating optical system 18, which, in this embodiment, is a third bi-convex lens 72c followed by a plano-convex lens 80 along the ray path. The function of the combination of bi-convex lens 72c and plano-convex lens 80 in the collimating optical system 18 is for collimation of the light beam.

Figure 9:
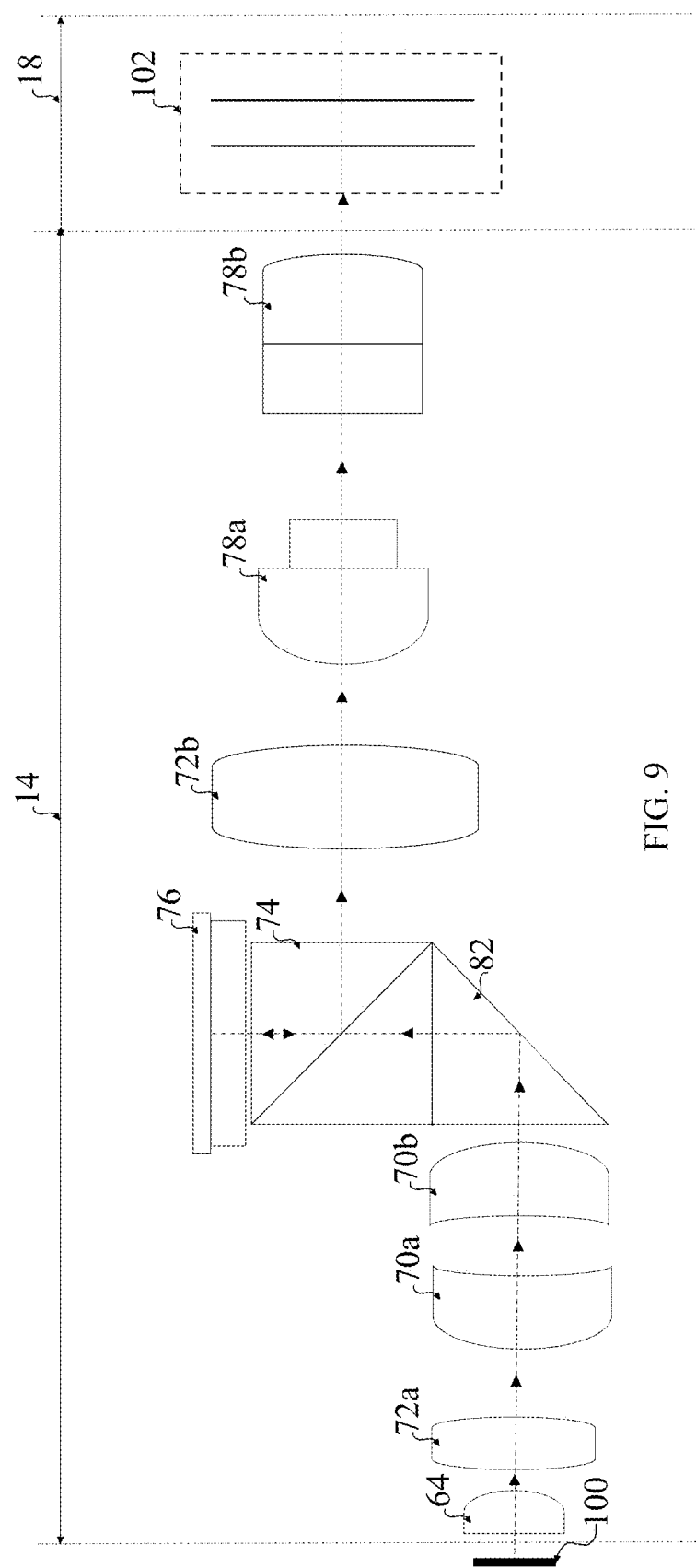
FIG. 9 illustrates a configuration of the projection optical system arrangement and an alternative collimating optical system.

FIG. 9 illustrates the projection optical system 14 arrangement as shown in FIG. 6 directing a light ray path to the collimating optical system 18 wherein the collimating optical system 18 is composed of two or more optical components. In this configuration, light emitted from LED package 100 is directed to the projection optical system 14. The projection optical system 14 is composed of a plano-convex lens 64, in which light from LED package 100 is directed. The ray path is then directed to a first bi-convex lens 72a followed by a pair of meniscus lenses 70a, 70b, and then through to a single prism 82. The ray path through prism 82 is then directed to a folded prism 74 and pixel forming device 76, then back through the folded prism 74 and through to a second bi-convex lens 72b followed by a series of projection doublets 78a, 78b. The ray path then continues to the collimating optical system 18, which, in this embodiment, comprises one or more collimating optical components. The one or more collimating optical component 102 in the collimating optical system 18 function to collimate the incoming light and can include but are not limited to one or more components such as optical diffusers and lenses of one or more different lens types, such as a biconvex lenses and plano lenses.

Figure 10:
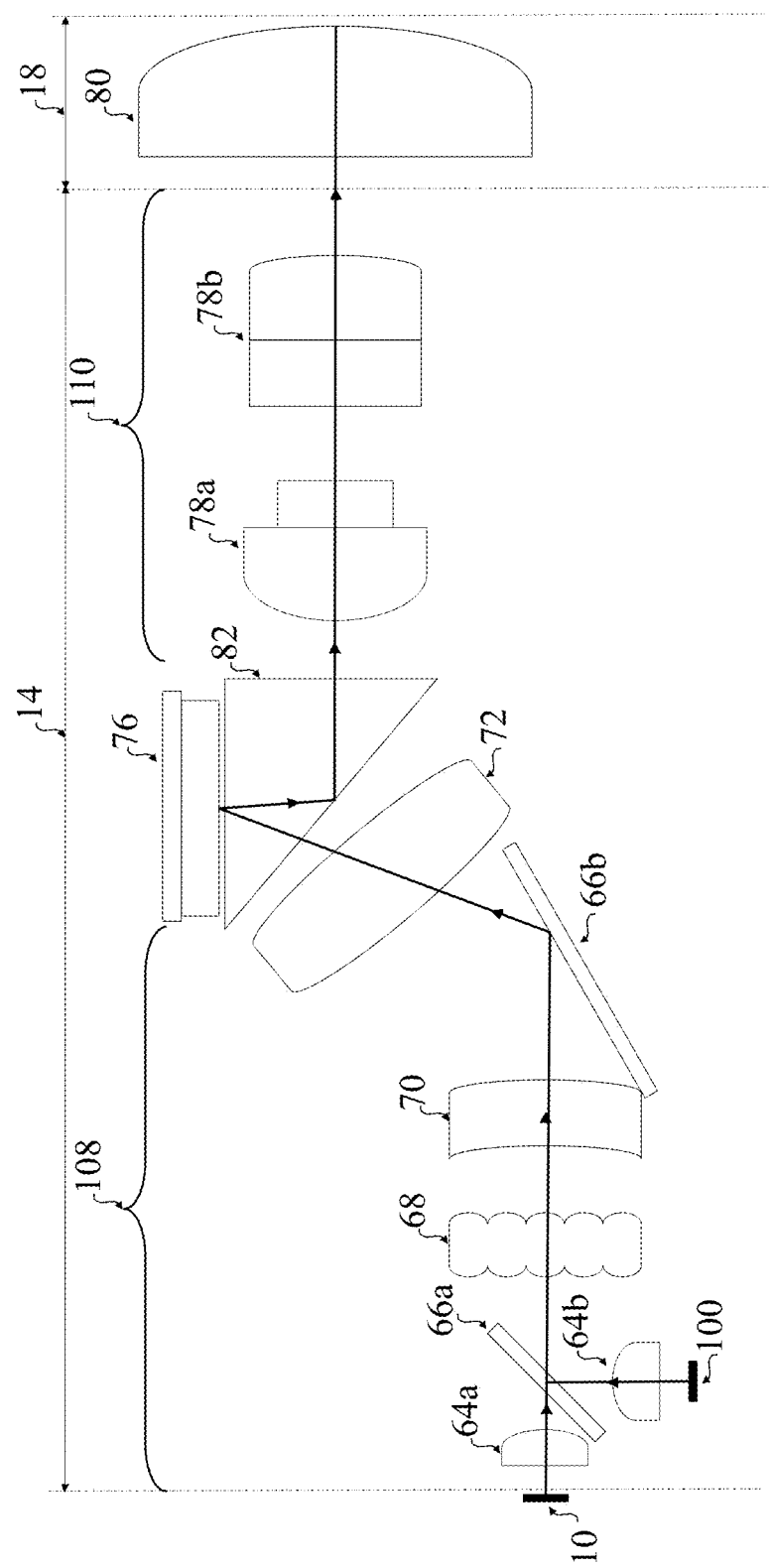
FIG. 10 illustrates a configuration of a projection optical system arrangement and a collimating optical system.

FIG. 10 illustrates a configuration of the projection optical system 14 and the collimating optical system 18 which are incorporated in a light field projector body, as illustrated in FIG. 1. In this configuration, light emitted from a light emitting diode (LED) 10 or a light emitting diode (LED) package 100 is directed to projection optical system 14. The LED package 100 can be comprised of one or more LEDs which produce a plurality of light rays which are directed into the projection optical system 14. When the LED package 100 has a plurality of LEDs, the plurality of LEDs are preferably arranged in an array or closely-packed configuration so that the light emitted from the LED package 100 is relatively focused and of small diameter. LED package 100 can also comprise LEDs of one or more colors depending on the system design. Preferably LED package 100 comprises at least two LEDs. The light from LED 10 is directed through its own plano-convex lens 64a and light emitted from LED package 100 is directed to plano-convex lens 64b. The two individual ray paths are then directed to an illumination optical system 108 beginning with dichroic mirror 66a which merge the light to form a single ray path. LED 10 can be a single color that is transmitted by dichroic mirror 66a and LED package 100 can comprise any other colors that are reflected by dichroic mirror 66a to form a single ray path. In one example case, where LED package 100 emits blue and red light and LED 10 is a green LED, dichroic mirror 66a allows transmission of green light from LED 10 and reflection of red and blue light transmitted from LED package 100. The light ray path continues in the illumination optical system 108 through an microlens array 68 through to a meniscus lens 70, to a dichroic mirror 66b. Dichroic mirror 66b reflects green, red and blue light from LED 10 and LED package 100. The light is redirected through a bi-convex lens 72 and through to a single prism 82. The ray path through the prism 82 is directed to a pixel forming device 76, then back through the single prism 82 and through to a series of projection doublets 78. The light is redirected through a bi-convex lens 72 and through to a single prism 82. The ray path through the prism 82 is directed to a pixel forming device 76, then back through the single prism 82 and through a magnifying optical system 110 comprising a series of projection doublets 78a, 78b. The ray path then continues to the collimating optical system 18, which in this embodiment is a plano-convex lens 80. The function of plano-convex lens 80 in the collimating optical system 18 is for collimation of light coming from the projection optical system 14.

Figure 11:
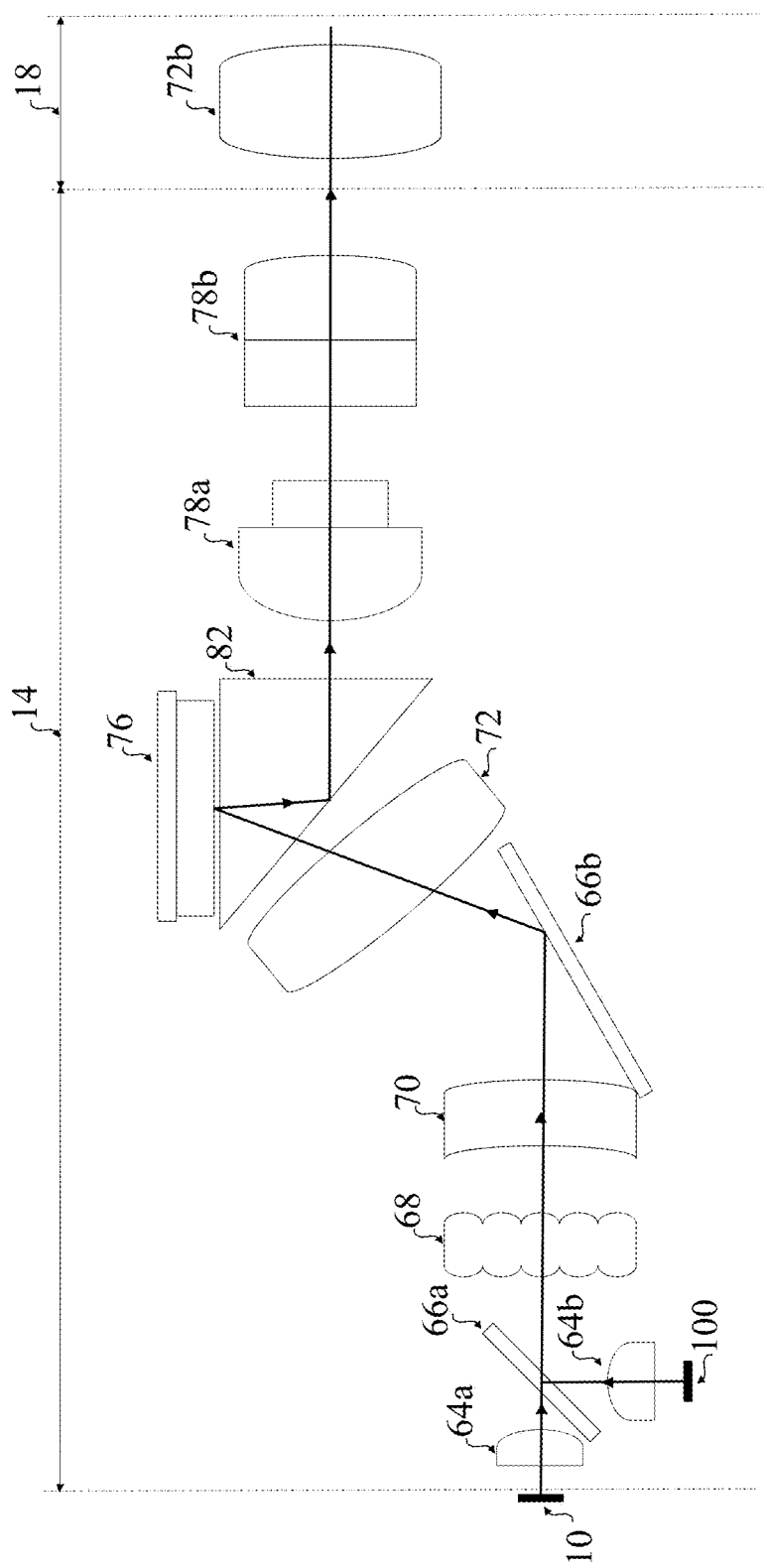
FIG. 11 illustrates a configuration of the projection optical system arrangement and an alternative collimating optical system.

FIG. 11 illustrates the projection optical system 14 arrangement as shown in FIG. 10 directing a light ray path to the collimating optical system 18 wherein the collimating optical system 18 is composed of a bi-convex lens 72b. In this configuration, light emitted from a light emitting diode (LED) 10 and a light emitting diode (LED) package 100 is directed to projection optical system 14. After LED 10 and LED package 100, the light ray path continues to, in series, a dichroic mirror 66a, microlens array 68, meniscus lens 70, to a second dichroic mirror 66b. The light is redirected through a bi-convex lens 72 and through to a single prism 82. The ray path through the prism 82 is directed to a pixel forming device 76, then back through the single prism 82 and through to a series of projection doublets 78a, 78b. The ray path then continues to the collimating optical system 18, which in this embodiment comprises a second bi-convex lens 72b. The collimating optical system 18 collimates light coming from the projection optical system 14.

Figure 12:
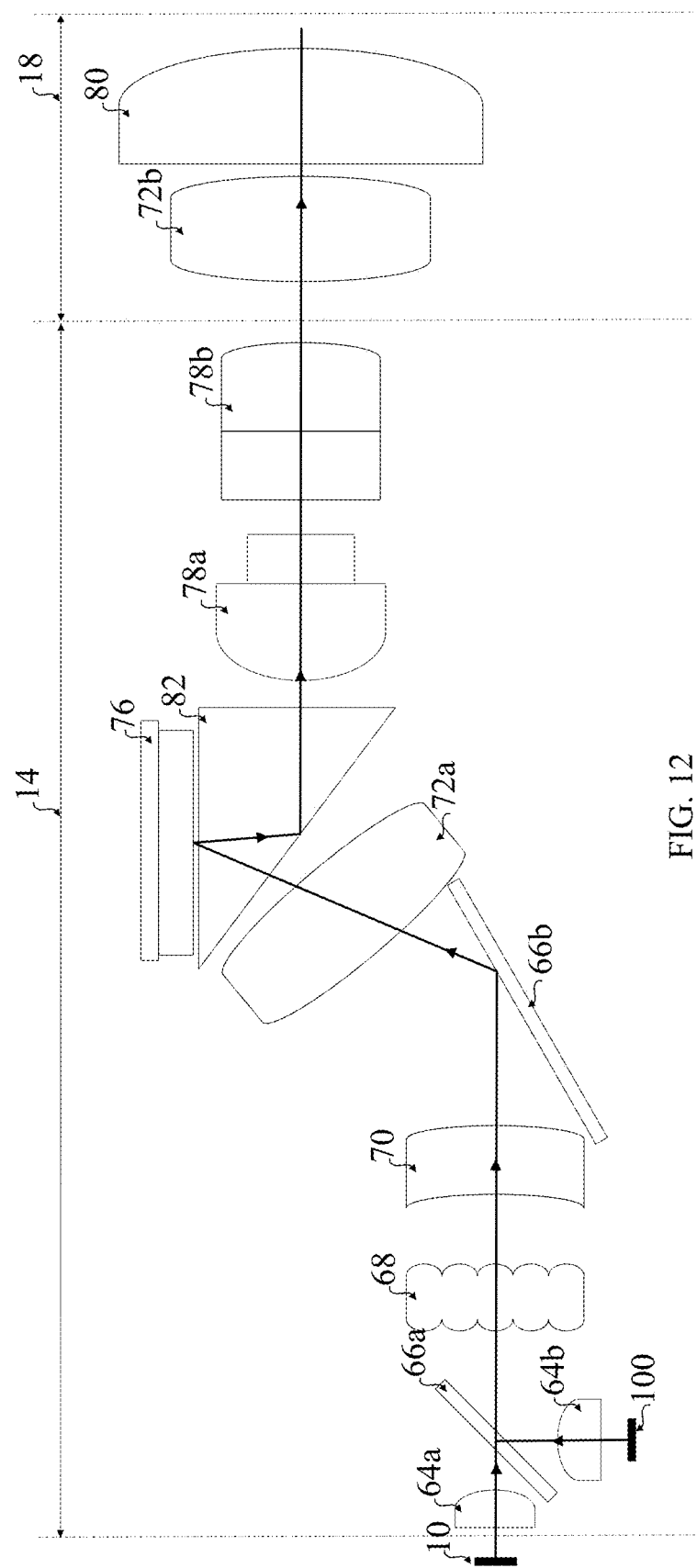
FIG. 12 illustrates a configuration of the projection optical system arrangement and an alternative collimating optical system.

FIG. 12 illustrates the projection optical system 14 arrangement as shown in FIG. 10 directing a light ray path to the collimating optical system 18 wherein the collimating optical system 18 is composed of a bi-convex lens 72b and a plano-convex lens 80. In this configuration, light emitted from a light emitting diode (LED) 10 and a light emitting diode (LED) package 100 is directed to projection optical system 14. After LED 10 and LED package 100, the light ray path continues to, in series, a dichroic mirror 66a, microlens array 68, meniscus lens 70, to a second dichroic mirror 66b. The light is redirected through a bi-convex lens 72a and through to a single prism 82. The ray path through the prism 82 is directed to a pixel forming device 76 then back through the single prism 82 and through to a series of projection doublets 78a, 78b. The ray path then continues to the collimating optical system 18, which in this embodiment is a second bi-convex lens 72b followed by a plano-convex lens 80 along the ray path. The collimating optical system 18 collimates light coming from the projection optical system 14.

Figure 13:
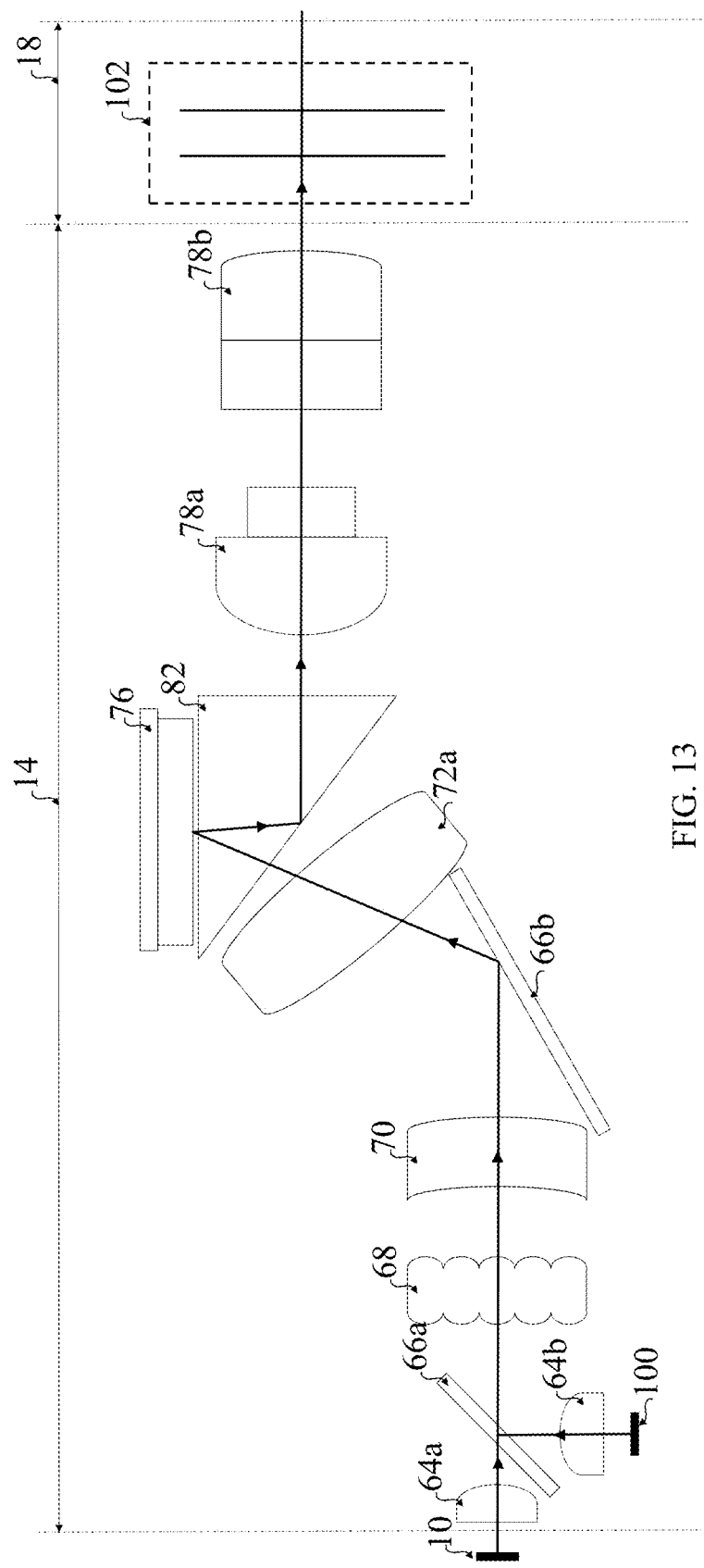
FIG. 13 illustrates a configuration of the projection optical system arrangement and an alternative collimating optical system.

FIG. 13 illustrates the collimating optical system 14 arrangement as shown in FIG. 10 directing a light ray path to the collimating optical system 18 wherein the collimating optical system 18 is composed of two or more optical components. In this configuration, light emitted from a light emitting diode (LED) 10 and a light emitting diode (LED) package 100 is directed to projection optical system 14. After LED 10 and LED package 100, the light ray path continues to, in series, a dichroic mirror 66a, microlens array 68, meniscus lens 70, to a second dichroic mirror 66b. The light is redirected through a bi-convex lens 72 and through to a single prism 82. The ray path through the prism 82 is directed to a pixel forming device 76 then back through the single prism 82 and through to a series of projection doublets 78a, 78b. The ray path then continues to the collimating optical system 18, which in this embodiment comprises one or more collimating optical component 102. The one or more collimating optical component 102 in the collimating optical system 18 function to collimate the incoming light and can include but are not limited to one or more components such as optical diffusers and lenses of one or more different lens types, such as a biconvex lenses and plano lenses. The collimating optical system 18 collimates light coming from the projection optical system 14.

Figure 14A:
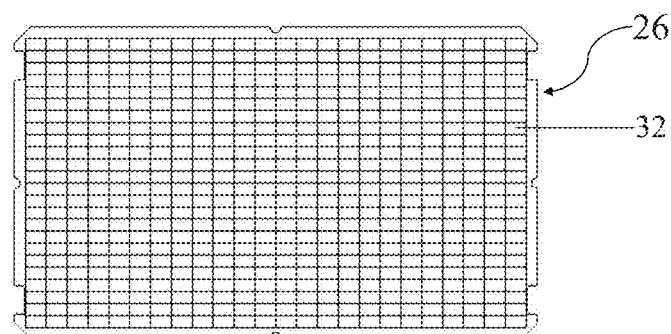
FIG. 14A is a front diagram of a collimating lens array.
Figure 14B:
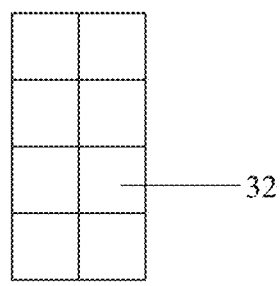
FIG. 14B is a diagram of a magnified view of a 2×4 grid of a collimating lens array in FIG. 14A.

FIG. 14A is a front diagram of a collimating lens array which is functions as a collimating lens array in the collimating optical system. In this example, collimating lens array 26 is generally rectangular, and has a plurality of collimating lenslets 32 also referred to as lenslets, a close-up of which is shown in FIG. 14D. The collimating lens array 26 may be constructed using a substrate to which is adhered a plurality of small lenses or collimating lenslets 32 to form a single piece fixed to the substrate. The adhering can be done using, for example, an optically clear adhesive with a specific refractive index, or an optically clear tape. The substrate may be made from, for example, a cyclic olefin copolymer (COC), glass, cyclic olefin polymer (COP), PMMA, polycarbonate, polystyrene, isoplast, Zeonex® E48R, optical polyester, acrylic, polyetherimide (PEI), or other suitable material. The collimating lens array 26 comprises one or more collimating lenslet 32 positioned to align with a corresponding LED upstream the projection optical system such that each collimating lenslet 32 receives light from its LED. The collimating lens array 26 may be coated on one or both sides with an anti-reflective coating. In the example of FIG. 14B, the collimating lenslet 32 includes two plano-convex lenses and a substrate 34. The convex lenses may be formed of, e.g., Zeonex® E48R, glass, cyclic olefin polymer (COP), PMMA, polystyrene, isoplast, optical polyester, acrylic, polyetherimide (PEI), or other suitable materials. The two plano-convex lenses and substrate 34 can be arranged to form a single bi-aspherical convex lens, which can act as a collimating lenslet 32.

FIG. 14B is a diagram of a magnified view of a 2×4 grid of the collimating lens array shown in FIG. 14A.

Figure 14C:
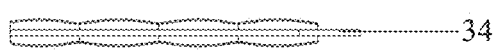
FIG. 14C is diagram of a profile view of a collimating lens array FIG. 14A.
Figure 14D:
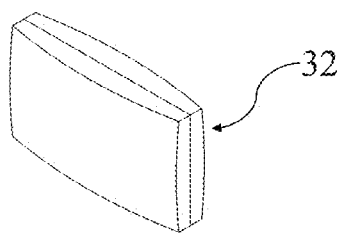
FIG. 14D is diagram of an isometric view of a single lens in a collimating lens array FIG. 14A.

FIG. 14C is diagram of a profile view of a collimating lens array FIG. 14A.

FIG. 14D is diagram of an close-up isometric view of a single collimating lenslet 32 in a collimating lens array shown in FIG. 14A.

Figure 15A:
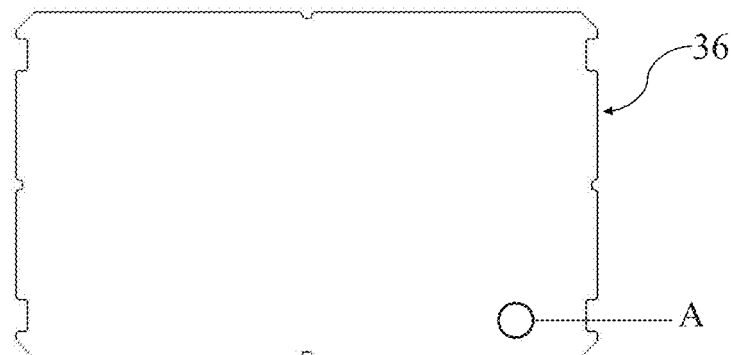
FIG. 15A is a diagram of an engineered diffuser.

FIG. 15A is a diagram of an engineered diffuser 36 which can optionally be in the projector device downstream the collimating optical system along the ray path. Engineered diffuser 36 comprises a laser etched engineered diffuser 36 which functions to scatter the light rays. In some examples, the engineered diffuser 36 is a single diffuser lenslet or diffuser lenslet array as shown in FIG. 15C. In one implementation of the present disclosure, the engineered diffuser 36 has a circular angle of 3.5 degrees and does not require coating.

Figure 15B:
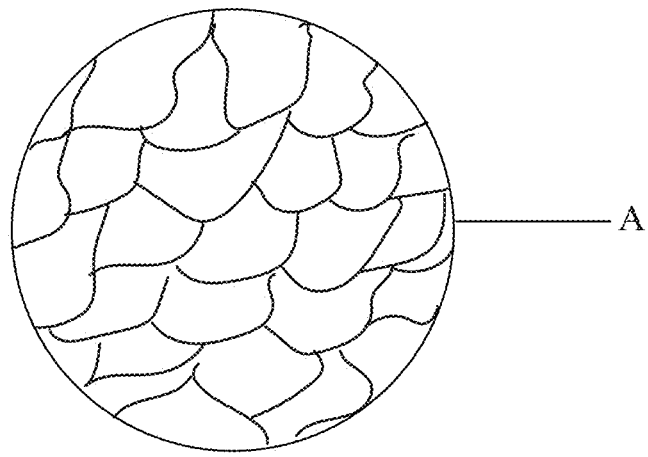
FIG. 15B is a magnified diagram of a laser etched engineered diffuser.
Figure 15C:
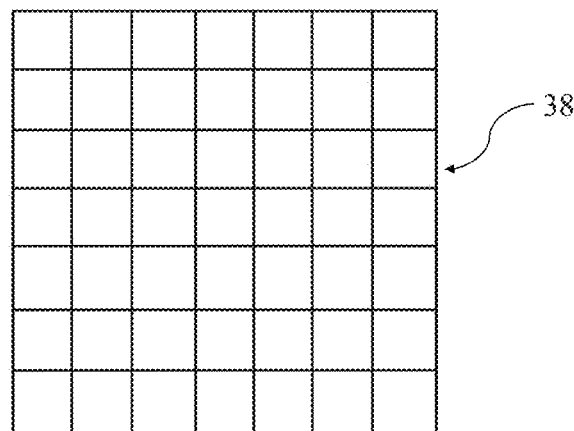
FIG. 15C is a magnified diagram of a diffuser lens array.

FIG. 15B is a magnified diagram of a laser etched engineered diffuser, magnified as section A from FIG. 15A. This is an illustration to represent the molecular arrangement of a laser etched engineered diffuser.

FIG. 15C is a magnified diagram of a diffuser lenslet array 38, which is one embodiment of the engineered diffuser 36. The diffuser lenslet array is an alternative diffusing component composed of multiple diffusing lenslets as opposed to a laser etched engineered diffusing surface.

Figure 16A:
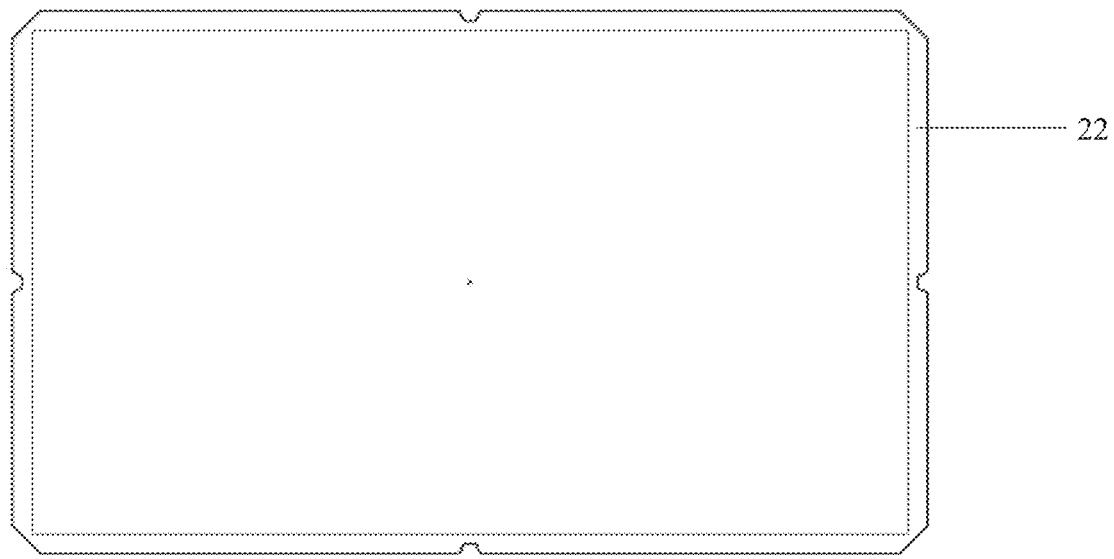
FIG. 16A is a diagram of a display optical system display lens.

FIG. 16A illustrates a display optical system 22, shown as a single display lens. The display lens consists of an array of hogels, and functions to redirect the collimated light rays from collimating optical system 18 into a distribution of rays, spanning a range of angles described by the Field of View of the display, such that their aggregate forms a light field image.

Figure 16B:
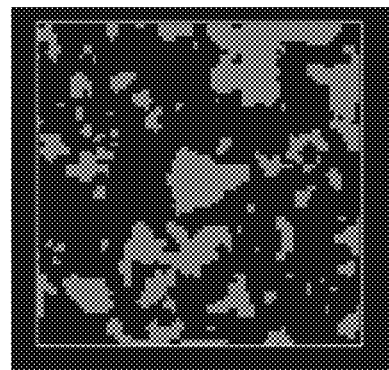
FIG. 16B is a diagram of an alternative display optical system comprising a metasurface.

FIG. 16B illustrates an alternative display optical system 22 as a metasurface or metamaterial. The display lens could be a periodic array of lenses, a metasurface, or any type of optical waveguide which fulfills the above description.

Figure 16C:
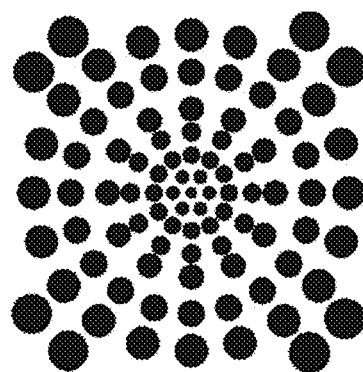
FIG. 16C is a diagram of an alternative display optical system.

FIG. 16C illustrates a further alternative display optical system 22 as an engineered surface which functions to redirect the collimated light rays from collimating optical system 18 into a distribution of rays, spanning a range of angles described by the Field of View of the display, such that their aggregate forms a light field image.

Figure 17:
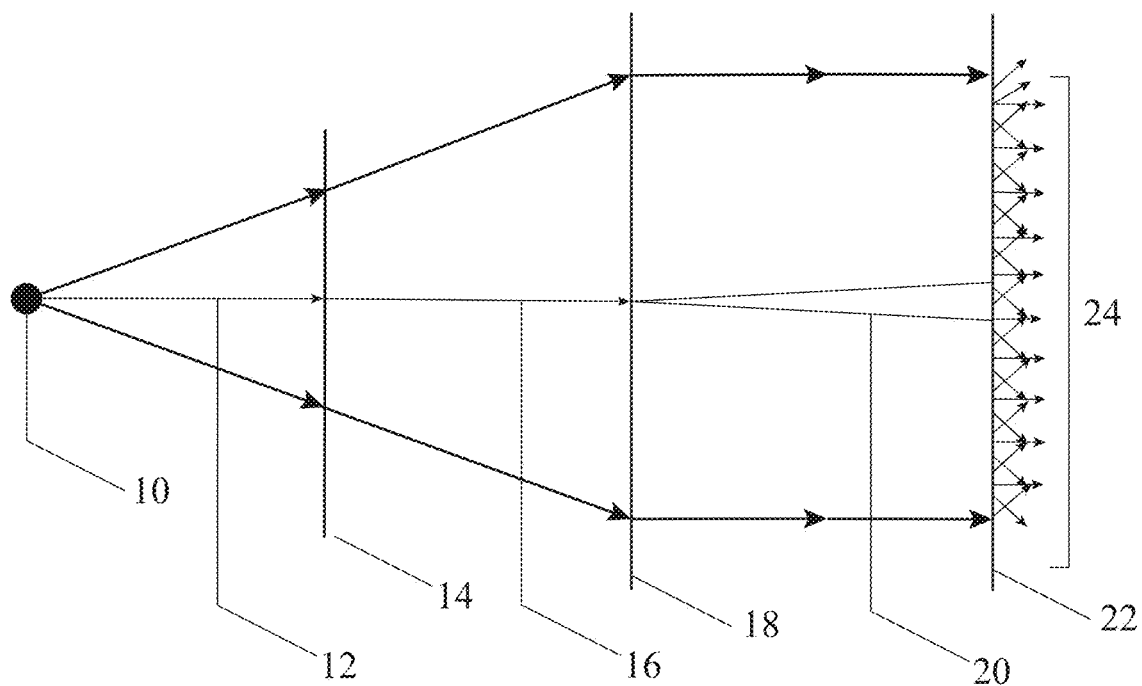
FIG. 17 illustrates a sample ray path of a single pixel of an embodiment of a light field projector device.
Figure 18:
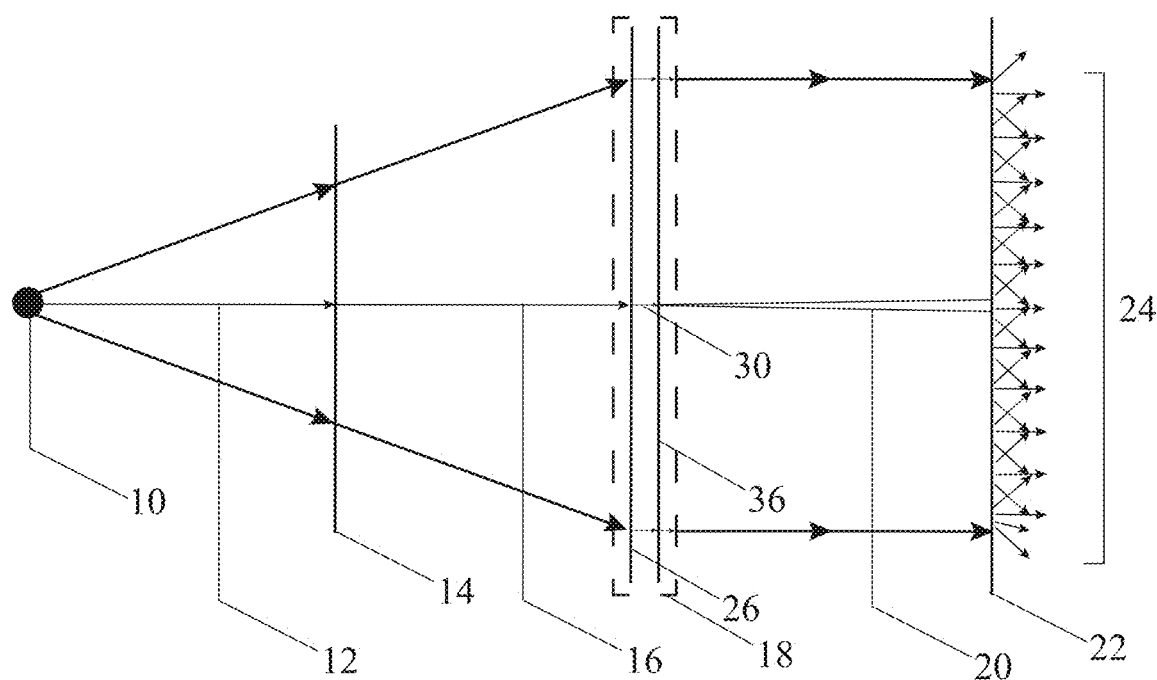
FIG. 18 illustrates a sample ray path of a single pixel of an alternative embodiment of a light field projector device.

FIG. 17 illustrates the ray path of light emitted from an LED 10 or LED package in the light field projector device. As shown, light ray 12 is emitted from a light source, preferably a light emitting diode (LED) 10, which can also be a plurality of LED, optionally in an LED package through the projection optical system 14. The projection optical system 14 may include optical projector components in various arrangements as previously described. Light is then output from the projection optical system 14 to form a first projected image 16 that travels to the collimating optical system 18, which collimates and diffuses the light rays forming a second projected image 20. The pixel pitch represents the spacing between adjacent pixels in the second projected image 20. The pixel pitch increased in size after the image leaves the pixel forming device due to the magnification effect of the magnifying optical system. The focal length is the distance between collimating optical system 18 and the display optical system 22. The collimating optical system 18 collimates the light and can comprise, for example, a collimating array, one or more lens structures or optical component capable of collimation. The second projected image 20 then travels to the display optical system 22, which in this case is a display lens. A display lens can be formed from, for example, an array of lenslets or metasurface, and converts spatial pixels to directional views. The output of the display lens in the display optical system 22 forms the light field image 24. A hogel converts the spatial position of pixels into directional or well-controlled directional rays. One example of a hogel is a lens. Light field image 24 comprises an array of hogel The light field projector device may also include an adjustment mechanism for adjustment of a direction of the projected image or light ray path. Adjustment can compensate for error introduced by mechanical tolerancing, optical aberration, or other errors that cause deviation of the ray path from nominal. In one example, the adjustment mechanism can be a kinematic adjustment mechanism to allow for fine adjustment of the projector in all six degrees, within a design tolerance. In particular, the projector body can be adjustable in all cartesian directions x, y, z, and in angular directions yaw, pitch, and roll. The light field projector device may include a digital adjustment mechanism, which can set specific degrees of freedom with physical tolerances and uses additional pixels around the perimeter of the display device for the alignment of the device. It is also possible to use both kinematic and digital adjustment mechanisms in combination. Other features that can be part of the internal optical components include but are not limited to one or more of a static iris, engineered diffuser, collimation lens or collimation device, optical lenses, diffraction gratings, fiber optical components, laser optical components, one or more of which can be incorporated into the design of the light field projector device. A collimation lens may be, for example, a frameless collimation lens design capable of leveraging the bi-convex design of the optics to fill the lens aperture in the front of the body of the light field projector device. The lens aperture may be defined as the required hole or opening through which light travels. The light field projector device may also further comprise one or more conventional projector components such as printed circuit boards (PCBs), one or more memories, and a housing. The projector can also include additional internal optical components for further manipulation, diffusion and/or collimation of the light FIG. 18 illustrates the ray path of a single pixel in a light field projector device. Light rays 12 are emitted from a light emitting diode (LED) 10 through the projection optical system 14. The projection optical system 14 may include optical projector components in various arrangements. The projection optical system 14 emits rays to form a first projected image 16 that travels to the collimating optical system 18. The collimating optical system 18 collimates and diffuses the light rays forming a second projected image 20. The collimating optical system includes a collimating lens array 26 for collimation of the light rays and a diffuser 36 for diffusion of the light rays. The second projected image 20 travels to a display optical system 22, which is a display lens. The output of the display lens forms the light field image 24.

The collimating lens array 26 can include one or more lenses, lenslets, optical mirrors, or collimating optics. The collimating lens array 26 reduces the divergence of light emitted from the projection optical system 14. The collimating lens array 26 is positioned a throw distance from the projection optical system 14. In one instance, the throw distance is such that each pixel of the projector image increases in size proportional to the adjacent pixel, and results in no overlap in the pixels. The projection optical system 14 is placed such that the distance between the projection optical system 14 and the collimating lens array 26 creates a projected image equal in size to a single lenslet in the collimating lens array 26.

A collimated light beam 30 leaving the collimating lens array 26 travels to the diffuser 36. In some examples, the diffuser 36 can comprise an engineered diffuser array, or one or more lenses, optical mirrors, or optical materials that may be suitable for diffusion. The diffuser 36 is positioned between the collimating lens array 26 and the display optical system 22, and the diffuser 36 receives light from the collimating lens array 26. The collimating lens array 26 and the diffuser 36 can be a single integrated piece, or separate pieces. The display optical system 22 can be positioned to receive a second projected image 20 from the diffuser 36. Therefore, light from the collimating lens array 26 travels to the diffuser 36 which in one example is an engineered diffuser array. The output light rays forming a first projected image 16 from the projection optical system 14 are collimated to preserve the projected size of the image.

At the diffuser 36, the divergence of each pixel is increased by a factor of:

$$\sqrt{C^2 \cdot f_m^2}$$

where C is a constant that is chosen for proper reconstruction of the sampled wavefront and $f_m$ is a fill factor. In one example, the value of C is approximately 2. In such instances the fill factor, $f_m$, is approximately 0.9, such that the spot size, $x_s$, is related to the pixel spacing, $x_p$, as $$x_s = x_p \cdot \sqrt{C^2 \cdot f_m^2}$$

where $x_p$ is the lens pitch divided by the number of angular samples.

Therefore, the diffuser 36 imparts a point spread function on each pixel in the image. The pixels with the point spread function from the diffuser 36 are then incident on the back surface of the display optical system 22, which constitutes the display lens. As the light is incident on and passes through the diffuser 36, the light is dispersed according to a point spread function, approximated as a Gaussian function. The diffuser 36 may include an angular diffuser or engineered diffusing array which is used to achieve a desired spread function and prevent bleed from the projection of light from neighboring pixels. In one example, the projection optical system 14 creates an image having a size of 20 mm×10 mm at a distance defined by the throw ratio of the projector, where the throw ratio is the ratio of the distance from the lens to the screen (throw) to the screen width. This image may then be projected to a collimating lens array 26, resulting in a packet image that is the exact size (20 mm×10 mm) projected toward the diffuser 36, which is, for example, a diffuser screen or engineering diffuser array. The diffuser 36 can then create a small, defined point spread function. Using the desired point spread function, proper overlap between pixels is achieved to reduce resolution bias error or the picket fence effect, and distribute the light for a better viewing experience. Resolution bias error references missing information between samples in a spectrum. The reduction of the resolution bias error allows for smooth viewing zone transitions. The diffuser 36 in this instance is designed to a very specific angular output such that if, for example, the engineered divergence has a 5-degree circular FWHM, the beam through the optical system will also have an intensity profile of 5 degrees. This output is the light directed to the display lens of display optical system 22, which can be a metasurface, gradient index lens material, or any alternate optical structure to distribute light from each pixel according to a plenoptic sampling function as described above.

In a multi-device or multi-projector arrangement, each of the projection optical systems 14 in each of the devices or projectors may be aligned such that light exiting the collimating optical system 18 strikes normal to the display optical system 22. As such, each projection optical system 14 may be equipped with alignment hardware and a fine control mechanism to orient the light ray in the projector device. Depending on the tolerances necessary, there are several approaches to projector, or projection optical system 14 alignment. In one example, there can be provided one or more adjustment elements, for example, mechanical mounts, with screw adjusters to provide one-time rough alignment. In another example there can be provided one or more piezoelectric transducers, for example, for nano to micro scale electronic adjustment. These can also potentially be useful for active calibration schemes utilizing feedback. Other adjustment elements may include kinematic mounts and/or digitally controlled adjustment elements such as the above-mentioned piezoelectric transducers. The maximum amount of required adjustment is dictated by the dimensions of the lenslets illuminated by each of the projection optical systems 14.

Figure 19:
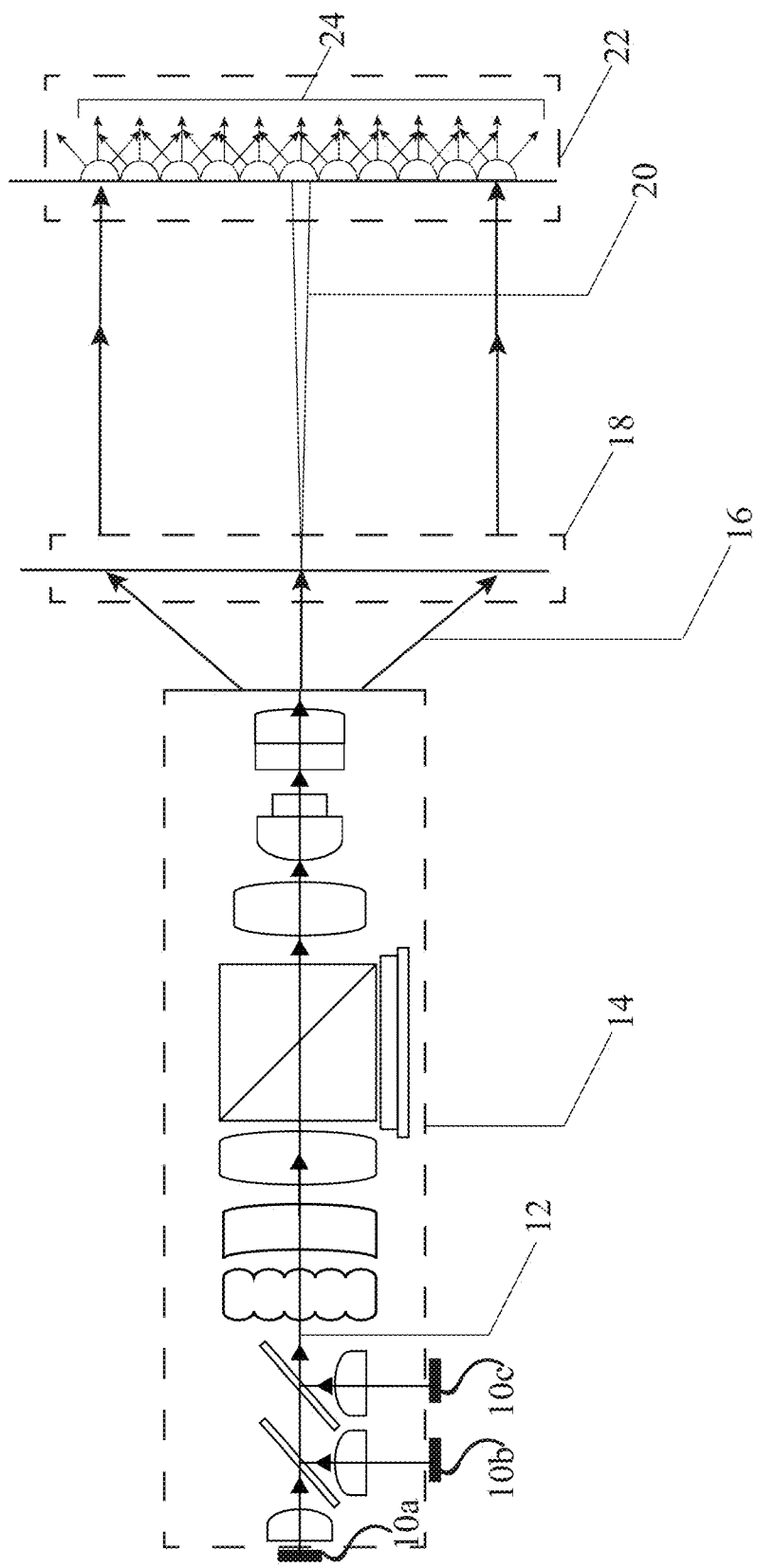
FIG. 19 illustrates a sample ray path of a single pixel and optical system components of an embodiment of a light field projector device.

FIG. 19 illustrates a ray path diagram of a light field projector device as per the present disclosure wherein the optics of the projection optical system 14 is the arrangement as illustrated in FIGS. 2-5. The output light ray 12 from a series of three LEDs 10*a*, 10*b*, 10*c*, through the projection optical system 14 forms a first projected image 16 which proceeds to a collimating optical system 18. The collimating optical system 18 shown is a single lens that outputs a second projected image 20 that is directed to the display optical system 22 which outputs a light field image 24. The collimating optical system 18 may consist of a light field projection lens.

Figure 20:
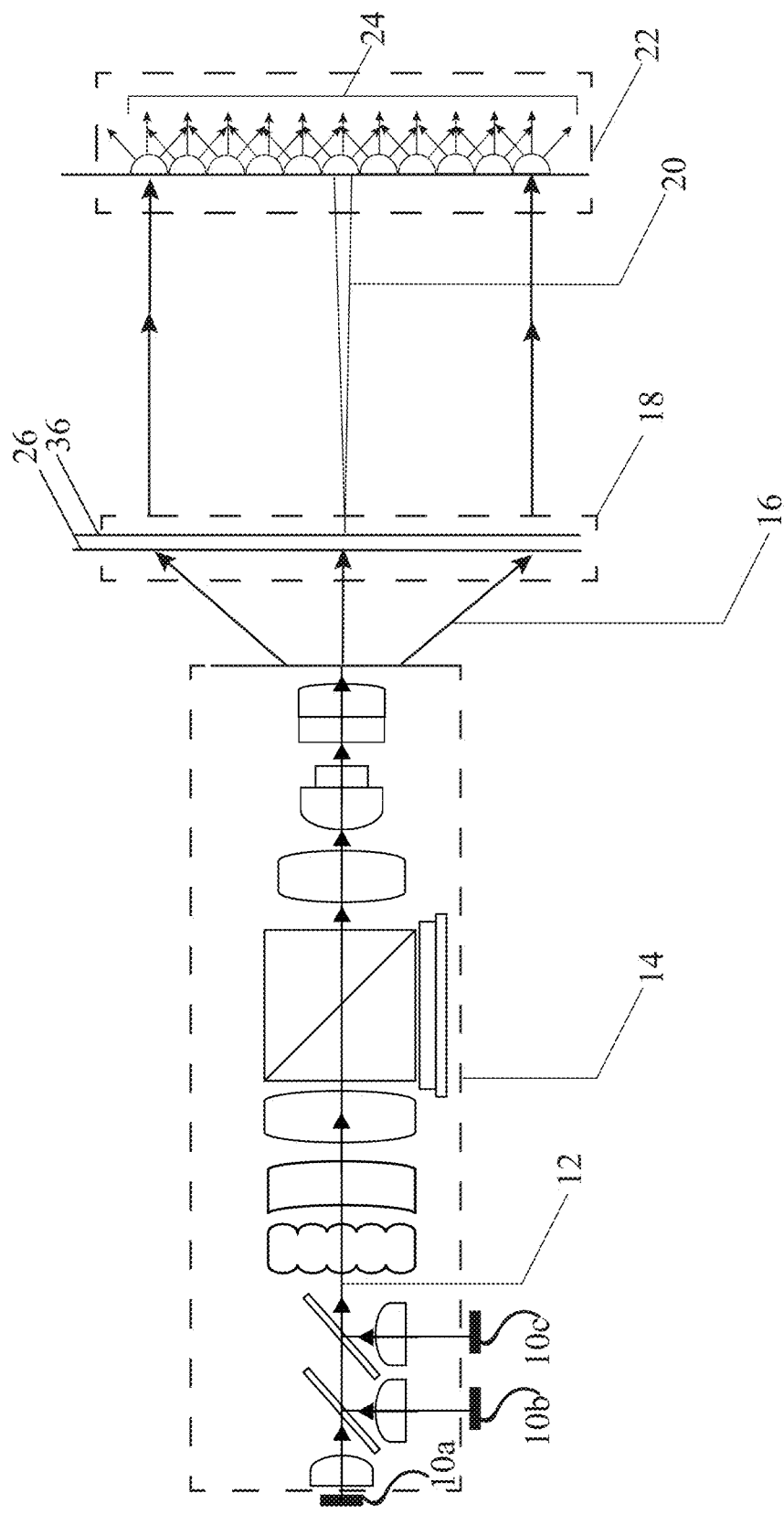
FIG. 20 illustrates a sample ray path of a single pixel and optical system components of an alternative embodiment of a light field projector device.

FIG. 20 illustrates an alternative ray path diagram of a light field projector device as per the present disclosure wherein the optics of the projection optical system 14 is the arrangement as illustrated in FIGS. 2-5. The output light ray 12 from a series of three LEDs 10*a*, 10*b*, 10*c*, through the projection optical system 14 projects a first projected image 16 to a collimating optical system 18, wherein the collimating optical system 18 has more than one lens or optical component, here shown as collimating lens array 26 and diffuser 36. The collimating optical system 18 outputs a second projected image 20 that is directed to a display optical system 22 which outputs a light field image 24.

Figure 21:
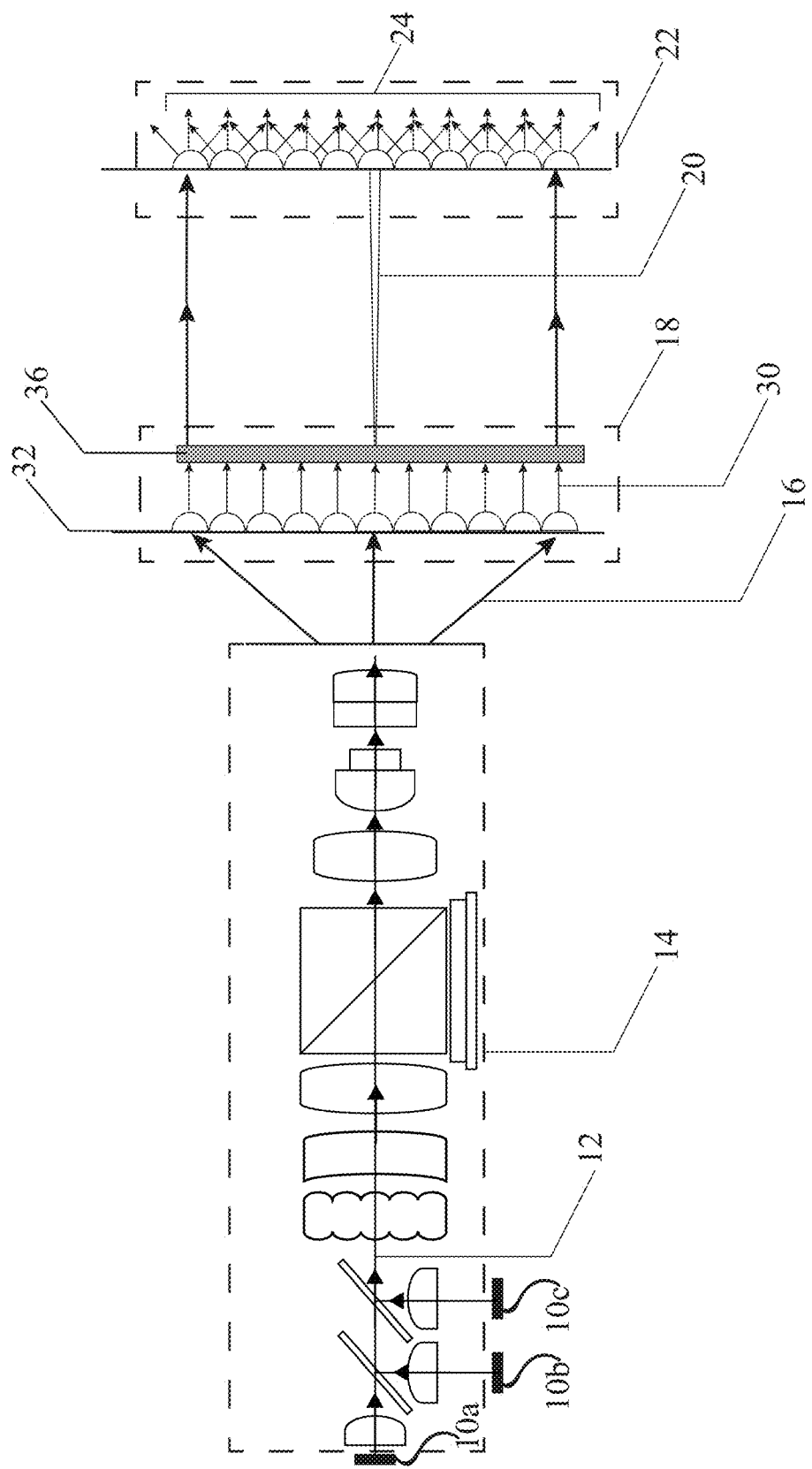
FIG. 21 illustrates a sample ray path of a single pixel and optical system components of an alternative embodiment of a light field projector device.

FIG. 21 illustrates an additional alternative ray path diagram of a light field projector device as per the present disclosure wherein the optics of the projection optical system 14 is the arrangement as illustrated in FIGS. 2-5. The output light ray 12 from a series of three LEDs 10*a*, 10*b*, 10*c*, through the projection optical system 14 projects a first projected image 16 to a collimating optical system 18, wherein the collimating optical system 18 has more than one lens or optical component that outputs a second projected image 20 that is directed to the display optical system 22 which outputs a light field image 24. In this arrangement, the collimating optical system 18 consists of a collimating lens array comprising a plurality of collimating lenslets 32 which outputs a collimated light beam 30 to a diffusing array or engineered diffuser 36, which may be an optical system or other optical component to output a second projected image 20 that is directed to the display optical system 22 which outputs a light field image 24.

Figure 22:
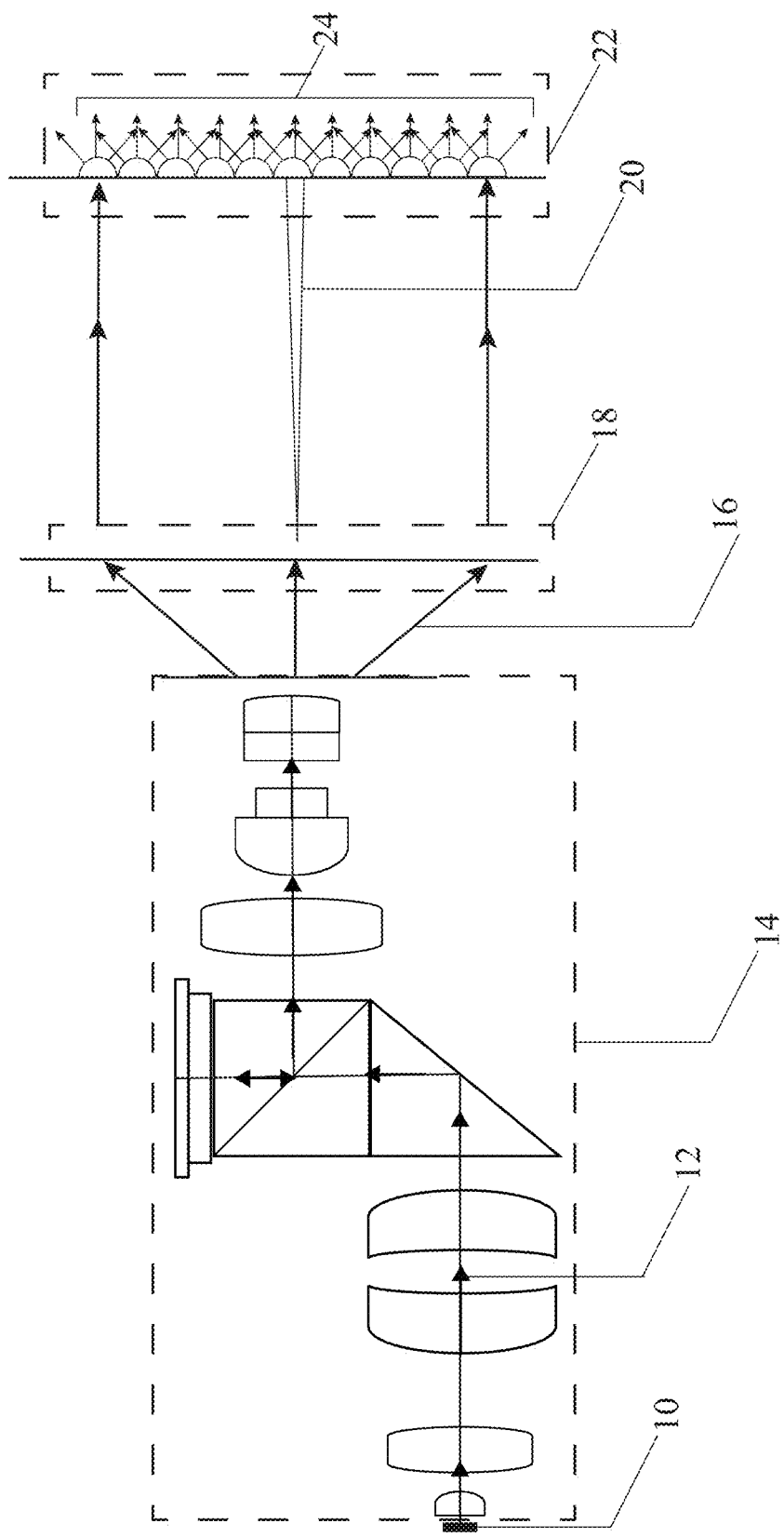
FIG. 22 illustrates a sample ray path of a single pixel and optical system components of an alternative embodiment of a light field projector device.

FIG. 22 illustrates a ray path diagram of a light field projector device as per the present disclosure wherein the optics of the projection optical system 14 is the arrangement as illustrated in FIGS. 6-9. The output light ray 12 from a single LED 10 through the projection optical system 14 projects a first projected image 16 to a collimating optical system 18 wherein the collimating optical system 18 is a single lens that outputs a second projected image 20 that is directed to a display optical system 22 which outputs a light field image 24. The collimating optical system 18 may consist of a light field projection lens.

Figure 23:
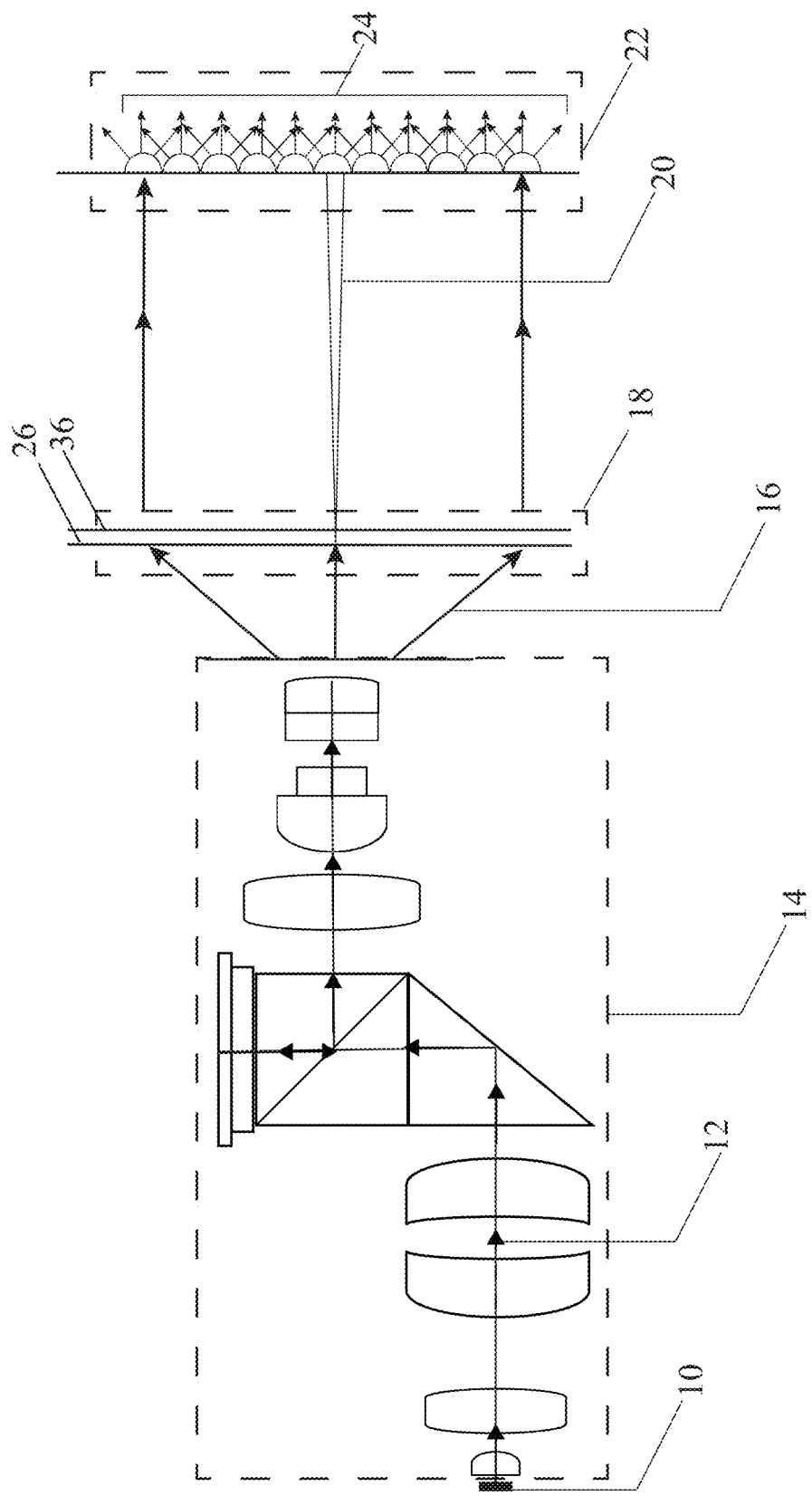
FIG. 23 illustrates a sample ray path of a single pixel and optical system components of an alternative embodiment of a light field projector device.

FIG. 23 illustrates an alternative ray path diagram of a light field projector device as per the present disclosure wherein the optics of the projection optical system 14 is the arrangement as illustrated in FIGS. 6-9. The output light ray 12 from a single LED 10 through the projection optical system 14 projects a first projected image 16 to a collimating optical system 18 wherein the collimating optical system 18 has more than one lens or optical component, shown here as a collimating lens array 26 and diffuser 36. The collimating optical system 18 outputs a second projected image 20 that is directed to the display optical system 22 which outputs a light field image 24.

Figure 24:
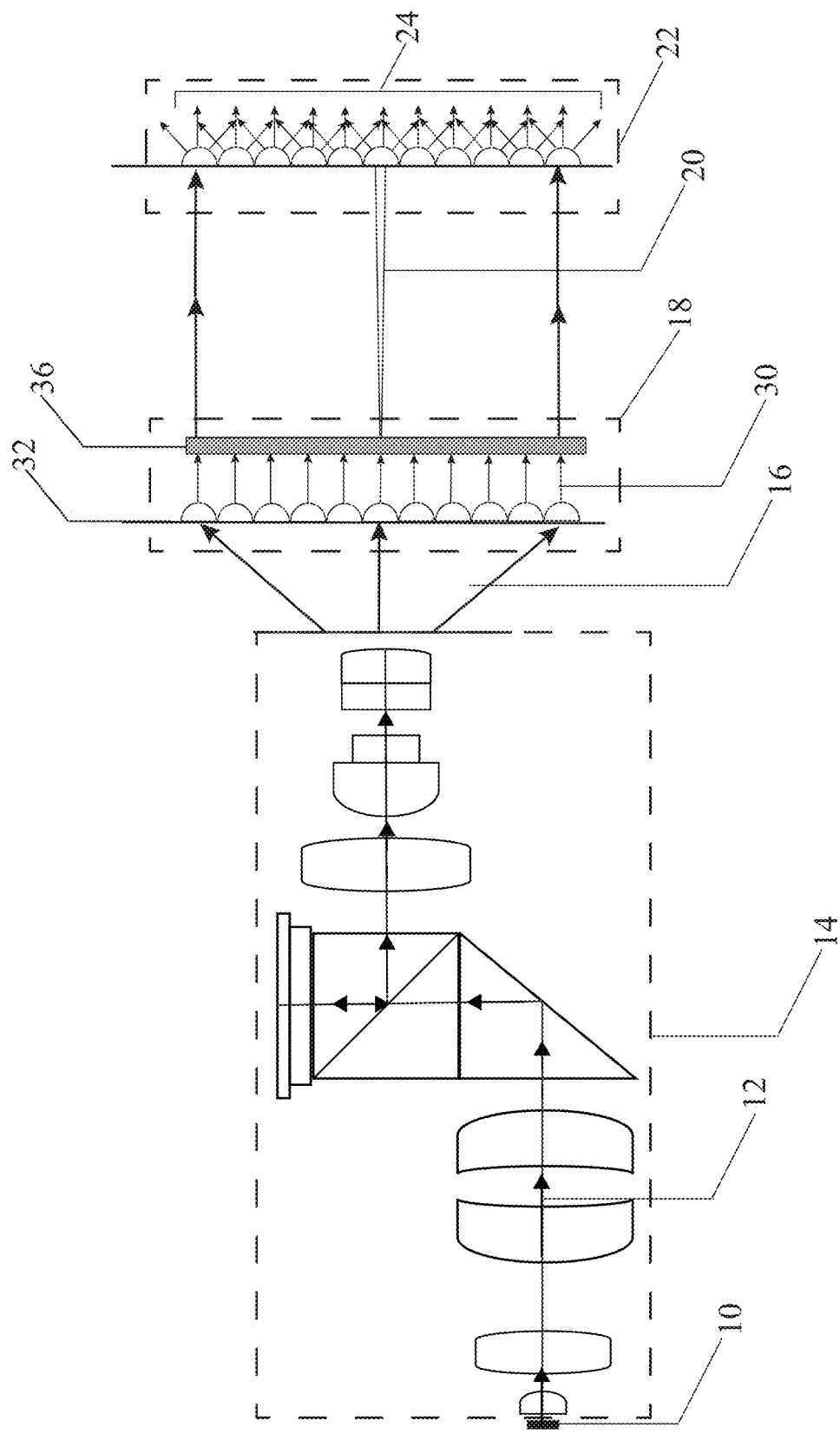
FIG. 24 illustrates a sample ray path of a single pixel and optical system components of an alternative embodiment of a light field projector device.

FIG. 24 illustrates an additional alternative ray path diagram of a light field projector device as per the present disclosure wherein the optics of the projection optical system 14 is the arrangement as illustrated in FIGS. 6-9. The output light ray 12 from a single LED 10 through the projection optical system 14 projects a first projected image 16 to a collimating optical system 18 wherein the collimating optical system 18 has more than one lens or optical component that outputs a second projected image 20 that is directed to the display optical system 22 which outputs a light field image 24. In this arrangement, the collimating optical system 18 consists of a collimating lens array comprising collimating lenslets 32 which outputs a collimated light beam 30 to a diffusing array or engineered diffuser 36, which may be an optical system or other optical component to output a second projected image 20 that is directed to the display optical system 22 which outputs a light field image 24.

Figure 25:
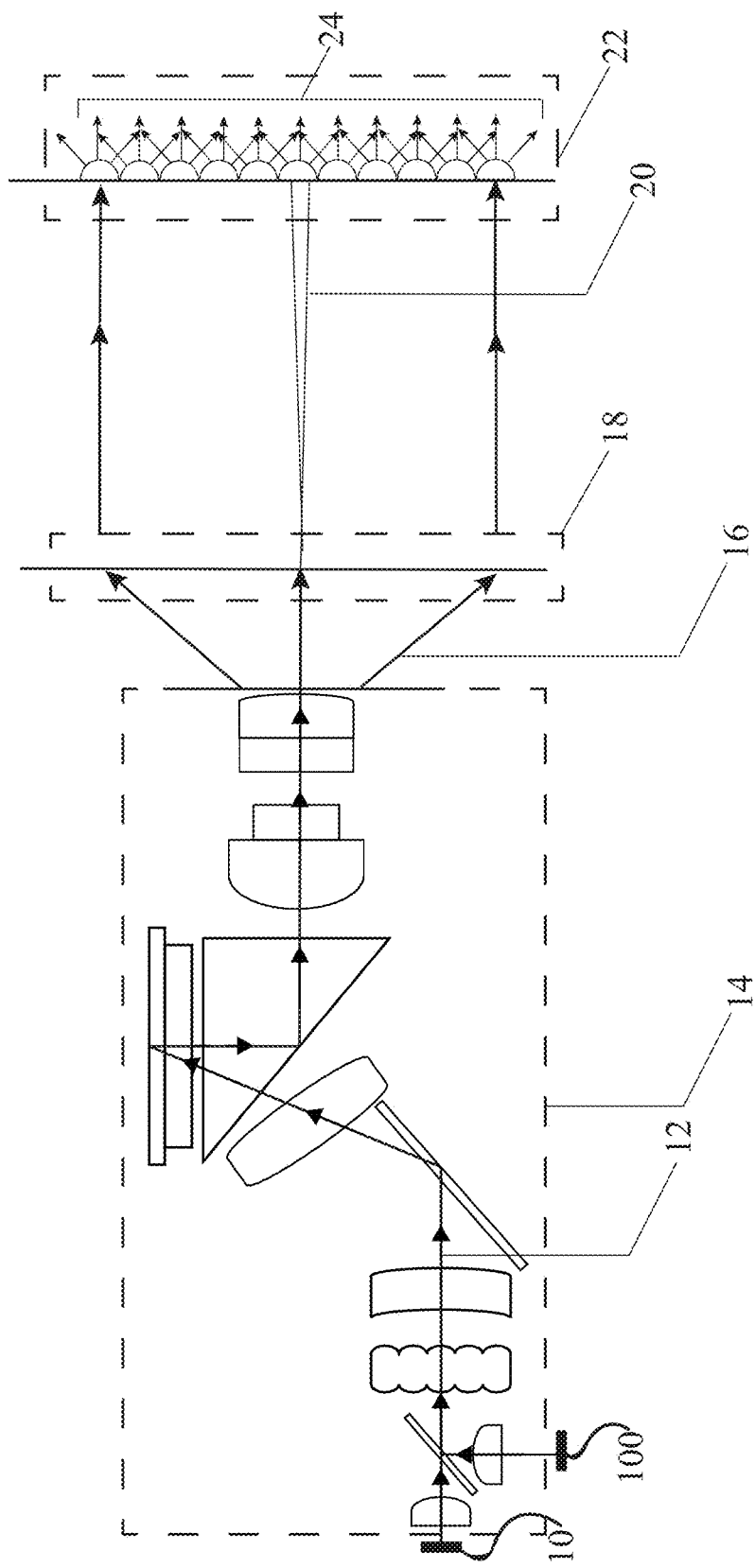
FIG. 25 illustrates a sample ray path of a single pixel and optical system components of an alternative embodiment of a light field projector device.

FIG. 25 illustrates a ray path diagram of a light field projector device as per the present disclosure wherein the optics of the projection optical system 14 is the arrangement as illustrated in FIGS. 10-13. The output light ray 12 from a light emitting diode (LED) 10*a* and a light emitting diode (LED) package 100 through the projection optical system 14 projects a first projected image 16 to a collimating optical system 18 wherein the collimating optical system 18 is a single lens, such as a light field projection lens. The collimating optical system 18 then outputs a second projected image 20 that is directed to the display optical system 22 which outputs a light field image 24.

Figure 26:
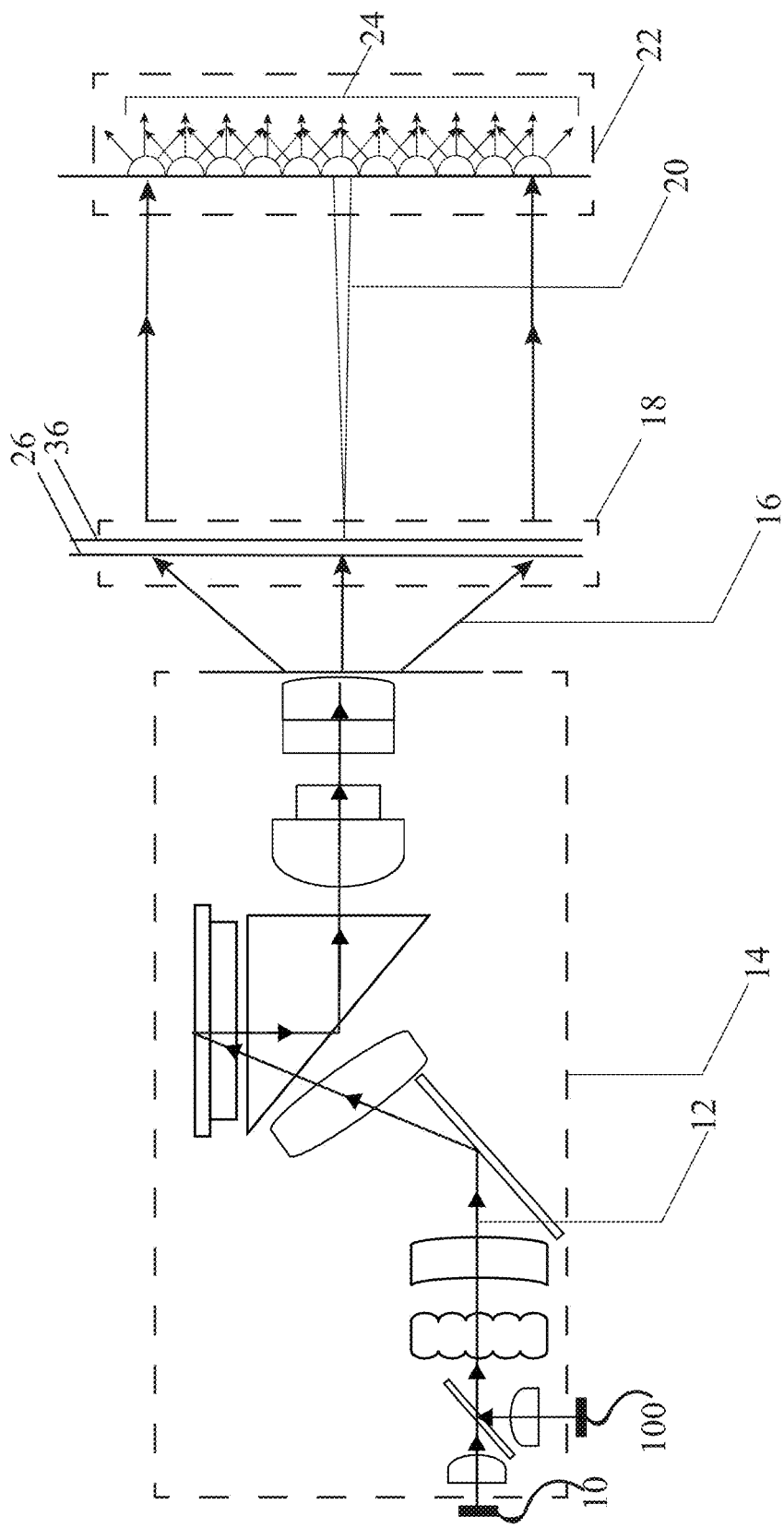
FIG. 26 illustrates a sample ray path of a single pixel and optical system components of an alternative embodiment of a light field projector device.

FIG. 26 illustrates an alternative ray path diagram of a light field projector device as per the present disclosure wherein the optics of the projection optical system 14 is the arrangement as illustrated in FIGS. 10-13. The output light ray 12 from a light emitting diode (LED) 10 and a light emitting diode (LED) package 100 through the projection optical system 14 projects a first projected image 16 to a collimating optical system 18 wherein the collimating optical system 18 has more than one lens or optical component, shown here as collimating lens array 26 and diffuser 36. The collimating optical system 18 then outputs a second projected image 20 that is directed to the display optical system 22 which outputs a light field image 24.

Figure 27:
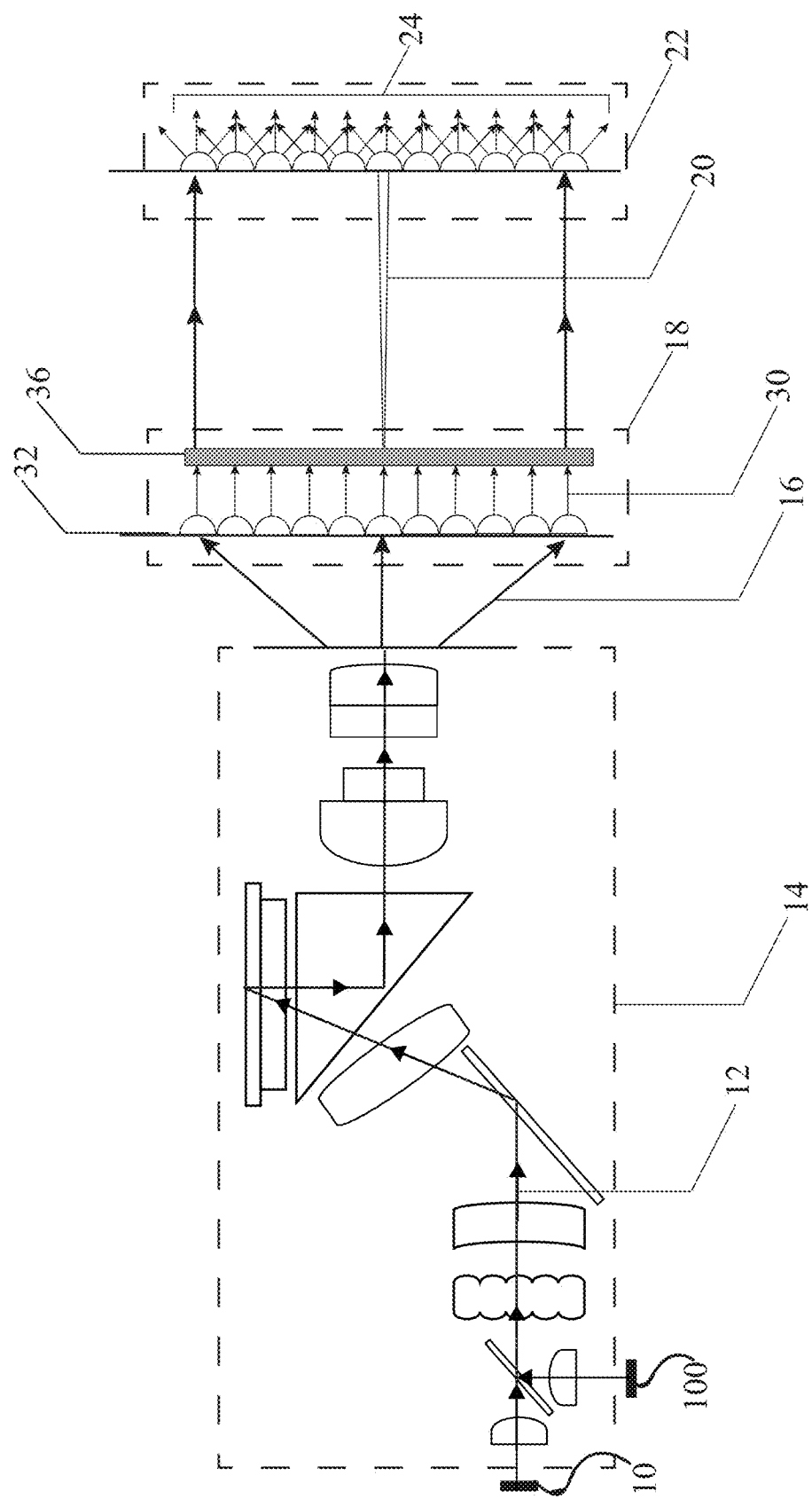
FIG. 27 illustrates a sample ray path of a single pixel and optical system components of an alternative embodiment of a light field projector device.

FIG. 27 illustrates an additional alternative ray path diagram of a light field projector device as per the present disclosure wherein the optics of the projection optical system 14 is the arrangement as illustrated in FIGS. 10-13. The output light ray 12 via a light emitting diode (LED) 10 and a light emitting diode (LED) package 100 through the projection optical system 14 projects a first projected image 16 to a collimating optical system 18. The collimating optical system 18 shown has more than one lens or optical component that outputs a second projected image 20 that is directed to the display optical system 22 which outputs a light field image 24. In this arrangement, the collimating optical system 18 consists of a collimating lens array comprising collimating lenslets 32 which outputs a collimated light beam 30 to a diffusing array or engineered diffuser 36 which may be an optical system or other optical component to output a second projected image 20 that is directed to the display optical system 22 which outputs a light field image 24.

Figure 28:
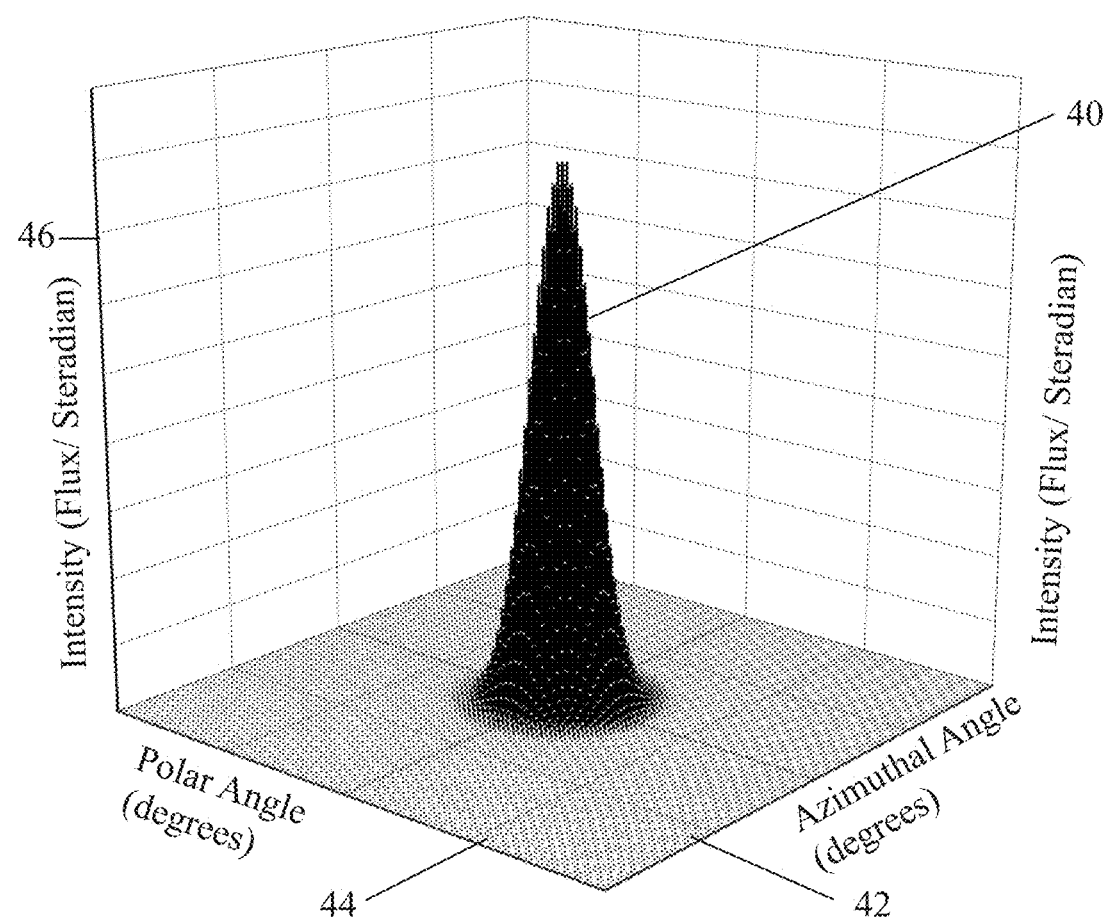
FIG. 28 is a diagram of a point spread function for a pixel in an engineered diffuser array.

FIG. 28 depicts a nominal point spread function according to an embodiment of the disclosure for a lenslet in the diffuser. In an example, the point spread function 40 may have a FWHM of twice the angle between two directional pixels. Shown is a graphical representation of the angular spread of a pixel in terms of the azimuthal angle 42 and the polar angle 44 versus intensity 46 of a light ray as function of the diffuser. In the presently described projector device, light is emitted from a projection optical system, characterized by a specified throw ratio, where each pixel of the projector image increases in size proportional to the adjacent pixel, resulting in no overlap in the pixels. Subsequently, at the collimating lens array, the output of the projection optical system is collimated to preserve the projected size of the image. The collimated beam is then incident on the diffuser, where the width of the beam is approximately equal on both optical systems. Finally, the pixels with the point spread function 40 from the diffuser are then incident on the back surface of the display optical system which constitutes the display lens. The distance between the display optical system and the collimating optical system allow for fine tuning of the output width of the pixels per image.

Figure 29:
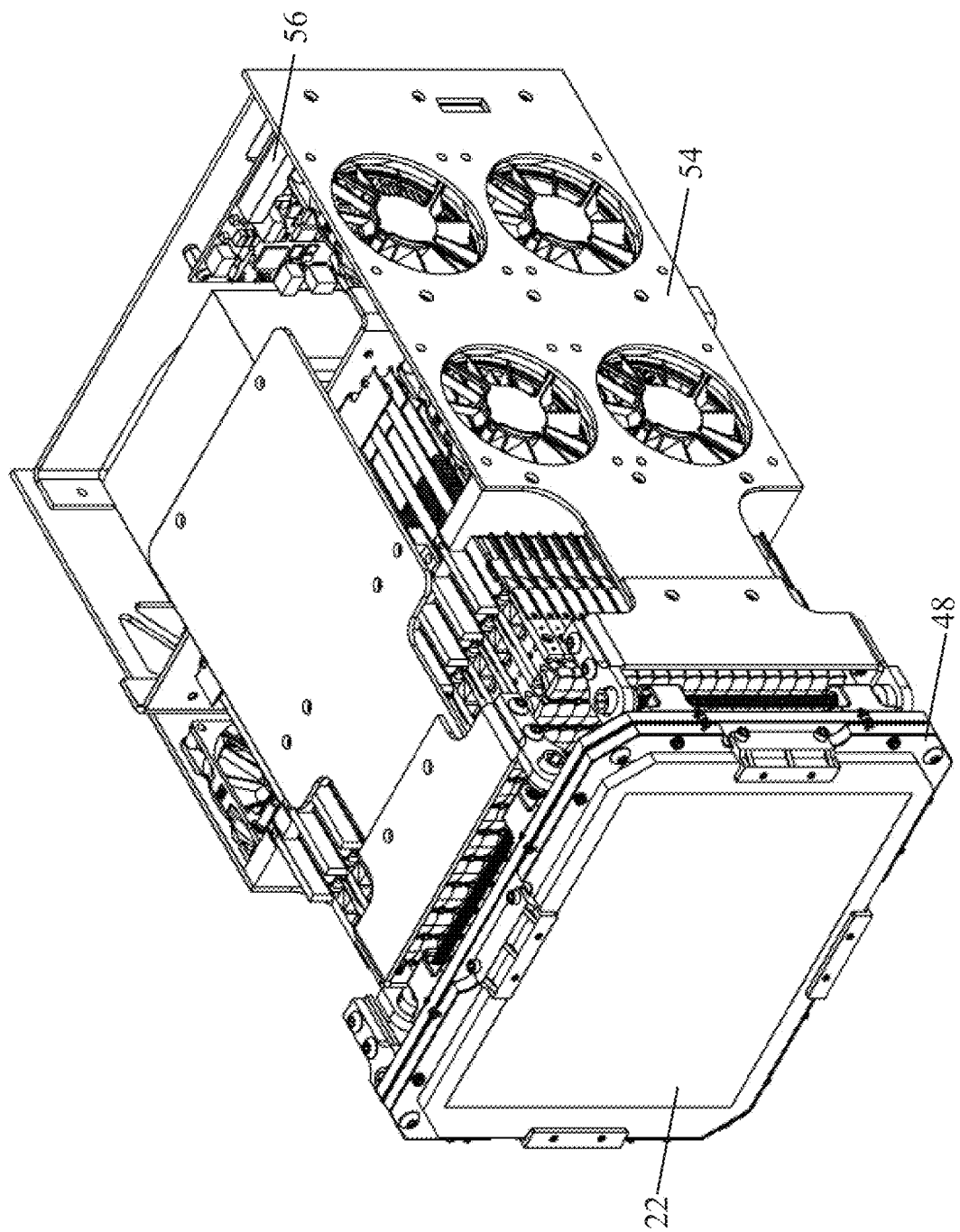
FIG. 29 illustrates an isometric view of a system consisting of an array of light projector devices.

FIG. 29 illustrates an isometric view of a light field image display device comprising an array of light field projector devices as presently described. The system shown has a plurality of light field projector devices secured within a light field image display device housing having side rails 54. The system is preferably controlled by a Printed Control Board (PCB) architecture 56. A display lens, also referred to as the display optical system 22, outputs the light field image and is secured to the light field projection system by a display lens mount 48.

Figure 30:
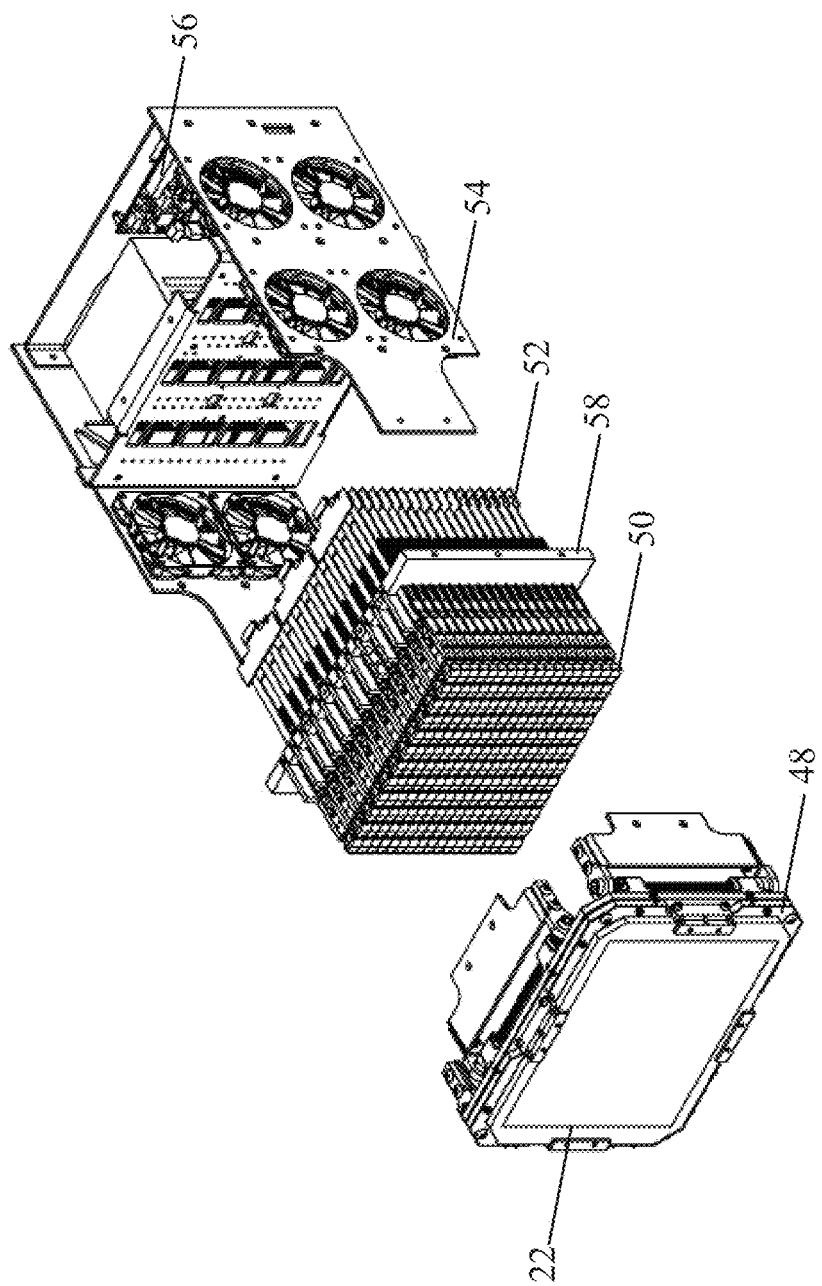
FIG. 30 illustrates an exploded view of a system consisting of an array of light projector devices.

FIG. 30 illustrates an exploded view of a light field image display device or system having an array of light field projector devices. The system includes a PCB architecture 56. The power source and cooling system is housed by the side rails 54 which also have fan mounts to cool the system. A PCB array 52 is powered and connected to a light field projector array 50 by a projector mount 58. A display lens, also referred to as the display optical system 22, outputs the light field image and is secured to the light field projection system by a display lens mount 48. In this example shown, the light field image display device has 18 rows and 12 columns of light field projector devices, totalling 216 light field projector devices in the array. Other array sizes are possible, and any size of array is possible. In one working configuration of the present light field image display device or system, the display optical system 22 is 187 mm tall and 228 mm wide, which is about the size of a small tablet.

Figure 31:
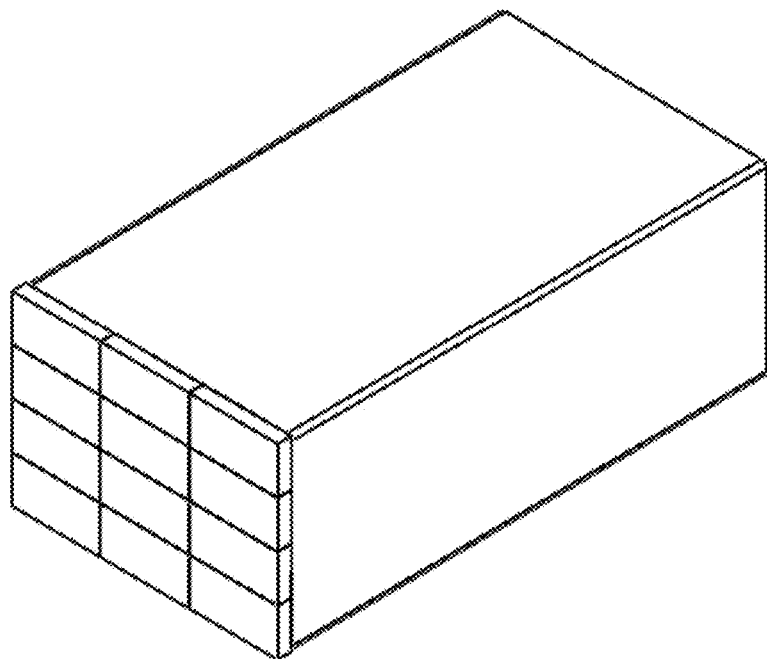
FIG. 31 illustrates an alternative configuration of a light field projector device containing 3×4 display units and a light field projector array.

FIG. 31 illustrates an alternative configuration of a light field projector device having a projector array comprising a plurality of 3×4 projector devices in a single projector body.

Figure 32:
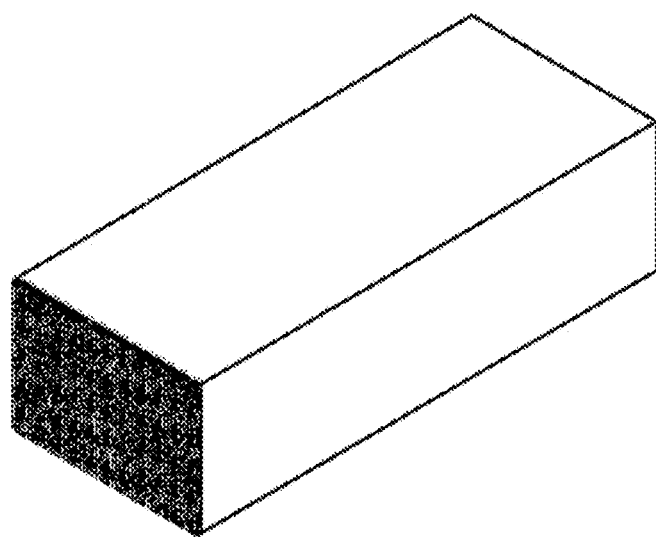
FIG. 32 illustrates an alternative configuration of a light field projector device containing an array of display units and all optical systems to create a light field display. The system can be tiled/stacked to create a larger display.

FIG. 32 illustrates an alternative configuration of a light field projector device containing an array of display devices and all optical systems to create a light field display. The system can be tiled/stacked to create a larger light field display.

Figure 33:
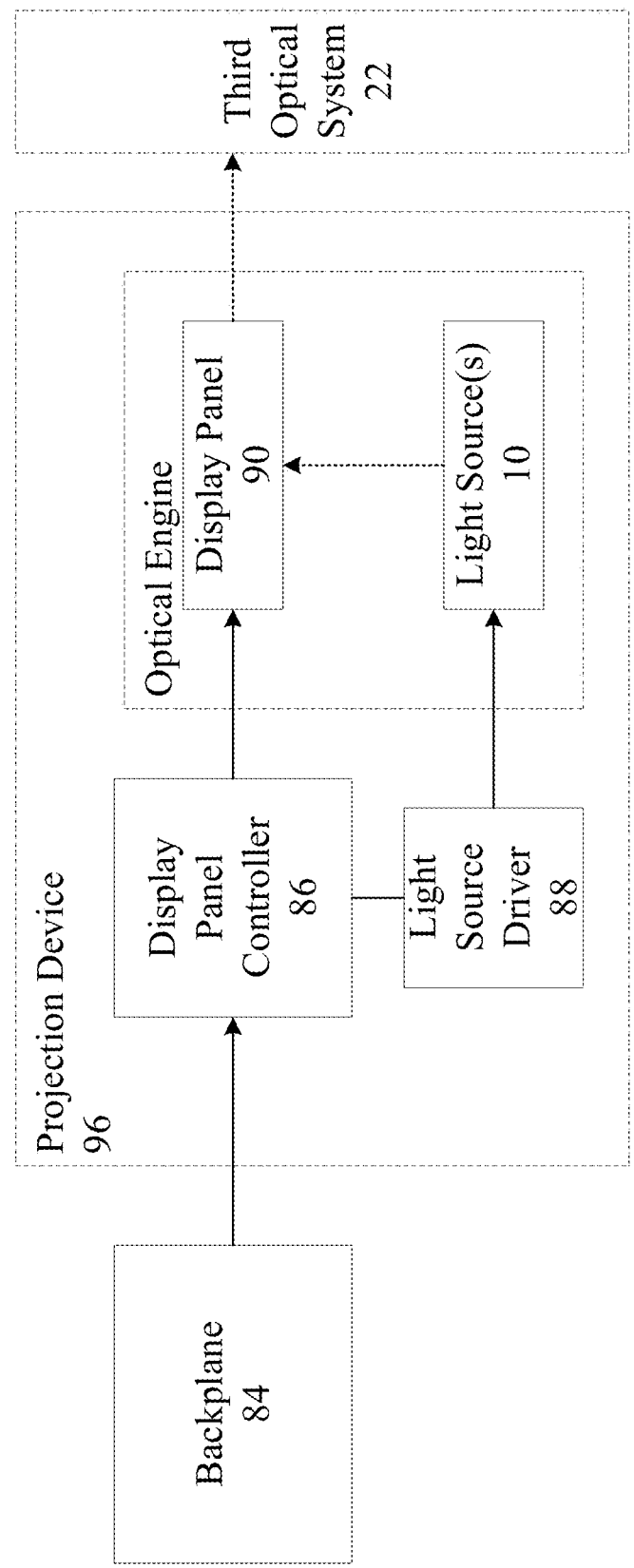
FIG. 33 illustrates a block diagram of a light field projector device.

FIG. 33 illustrates a block diagram for the present disclosure. The backplane 84 sends video and control data from an input device to the light field projection device 96. The display panel controller 86 creates a video input for the display panel 90, while also sending the enable signal to the light source driver 88 to power the light source(s) 10 in a frame sequential drive scheme. The light from the light source LED 10 is incident on the display panel 90 in the projection device resulting in a projected image on the display optical system 22.

FIG. 34A and FIG. 34B illustrate the assignment of pixels in a projector frame for the active image, overlap area, and correction buffer. In some embodiments, the projector contains a custom designed, edge-less Light Field Projection (LFP) lens 98 which wraps around the front edges of the projector as shown in FIG. 34A. FIG. 34A illustrates a first projected image 16 from a LED light source 10 through the LFP lens, which acts as the collimating optical system 18 to output a second projected image 20. This edge-less design will remove the tiling artifacts in the light field display due to projector alignment and lens array assembly tolerances. The projected light field image 24 size of each projector will allow for the removal of any display artifacts of the tiling of projectors in the system and allow for digital correction of the light field display. The diagrams below show a ray path through the LFP lens 98, demonstrating the pixel usage for each projector at the light field display. FIG. 34B illustrates the allotment of the overlap pixels 92, noting the correction pixels 94, and light field image pixels. The side view of the overlap pixels 92 and correction pixels 94 are also illustrated in FIG. 34A.

The disclosures of all patents, patent applications, publications referenced in this specification are hereby specifically incorporated by reference in their entirety to the same extent as if each such individual patent, patent application, publication and database entry were specifically and individually indicated to be incorporated by reference. Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

A number of embodiments have been described. Nevertheless, it will be understood that various modifications may be made without departing from the scope of the invention. For example, some of the steps described above may be order independent, and thus can be performed in an order different from that described. Other implementations are also within the scope of the following claims.

We claim:

1. A light field image display device comprising:
    a plurality of light field projector devices arranged in an array, each light field projector device comprising:
        a light source comprising a light emitting diode (LED);
        a projection optical system comprising:
            an illumination optical system comprising at least one lens to receive light from the light source and direct the light into a single ray path;
            a pixel forming device to receive light from the illumination optical system and convert the light into a pixel array; and
            a magnifying optical system to receive the pixel array;
        a collimating optical system comprising:
            a collimating optical component to collimate light from the pixel array received from the magnifying optical system and create a collimated projected image; and
            a diffuser downstream the collimating optical component to diffuse the collimated projected image, wherein diffusing the collimated projected image comprises imparting an angular point spread function; and
    a display lens positioned to receive the collimated projected image from the collimating optical component of each projector and adjust a pixel pitch and a hogel pitch of the collimated projected image to define a spatial resolution and depth of field and provide a tiled light field display.

2. The display device of claim 1, wherein the display lens is shared by two or more of the light field projector devices in the light field image display device.

3. The display device of claim 1, further comprising a housing for holding in place the plurality of light field projector devices.

4. The display device of claim 1, further comprising a plurality of adjustment mechanisms for adjusting a direction of the ray path exiting each of the plurality of light field projector devices.

5. A method for creating a tiled light field image with a plurality of light field projector devices, the method comprising:
    creating a plurality of light field images at a plurality of light field projector devices by:
        generating light with an LED light source;
        directing the light from the light source into a single ray path;
        pixelating the light into a pixel array;
        magnifying the pixel array;
        collimating the pixel array to create a collimated projected image;
        diffusing the collimated projected image, wherein diffusing the collimated projected image comprises imparting an angular point spread function;
        displaying the collimated projected image by adjusting a pixel pitch and a hogel pitch to define a spatial resolution and depth of field to provide a light field image; and
    tiling the plurality of light field images created from the plurality of light field projectors to provide a light field display.

6. The method of claim 5, wherein magnifying the pixel array at each of the plurality of light field projectors achieves overlap of the light field images from the plurality of light field projectors to provide a uniform tiled light field image.

7. The method of claim 5, wherein the angular point spread function is described by a Gaussian function with a Full-Width at Half Maximum (FWHM) characterized by one or more parameters of the light field projector device.

8. The method of claim 5, further comprising adjusting the ray path of one or more of the plurality of light field projector devices using an adjustment mechanism.

9. The method of claim 5, further comprising adjusting the focal length of the light field display.

10. A light field image display device comprising:
    a plurality of light field projector devices arranged in an array, each light field projector device comprising:
        a light source comprising a light emitting diode (LED);
        a projection optical system comprising:
            an illumination optical system comprising at least one lens to receive light from the light source and direct the light into a single ray path;
            a pixel forming device to receive light from the illumination optical system and convert the light into a pixel array; and
            a magnifying optical system to receive the pixel array;
        a collimating optical system comprising:
            a collimating optical system comprising an edge-less light field projection lens to collimate and diffuse light from the magnifying optical system by imparting an angular point spread function to create a collimated projected image; and
    a display lens positioned to receive the collimated projected image from the collimating optical system of each of the plurality of projector devices and adjust a pixel pitch and a hogel pitch of each collimated projected image to define a spatial resolution and depth of field and provide a tiled light field display.

11. The device of claim 10, wherein the light field projection lens is positioned a throw distance from the projection optical system.

12. The device of claim 10, wherein each of the plurality of light field projector devices further comprises a flex cable connected to a printed circuit board.

13. The device of claim 10, wherein each of the plurality of light field projector devices are connected to a printed circuit board (PCB) array.

14. The device of claim 10, wherein the projection optical system of each of the plurality of light field projector devices is housed in a projector body comprising a lens aperture through which projected light travels.

15. The device of claim 14, wherein the edge-less light field projection lens fills the lens aperture of the projector body.

* * * * *